(12) United States Patent
Eide et al.

(10) Patent No.: US 6,820,157 B1
(45) Date of Patent: Nov. 16, 2004

(54) APPARATUS, PROGRAM PRODUCT AND METHOD OF REPLACING FAILED HARDWARE DEVICE THROUGH CONCURRENT MAINTENANCE OPERATION

(75) Inventors: Curtis Shannon Eide, Rochester, MN (US); William Alan Thompson, Rochester, MN (US); James Lee Naylor, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 881 days.

(21) Appl. No.: 09/107,768

(22) Filed: Jun. 30, 1998

(51) Int. Cl.[7] .............................. G06F 13/00; H05K 7/10
(52) U.S. Cl. .............................. 710/303; 710/302; 710/8
(58) Field of Search ................................ 710/102, 103, 710/8, 302, 303

(56) References Cited

U.S. PATENT DOCUMENTS

| | | | |
|---|---|---|---|
| 5,430,855 A | * 7/1995 | Walsh et al. .................. 710/10 |
| 5,655,148 A | 8/1997 | Richman et al. ............ 395/828 |
| 5,666,557 A | * 9/1997 | Cassidy et al. ................ 710/8 |
| 5,751,975 A | 5/1998 | Gillespie et al. ............ 395/306 |
| 5,764,930 A | 6/1998 | Staats ........................ 395/287 |
| 5,781,798 A | 7/1998 | Beatty et al. ............... 395/830 |
| 5,784,644 A | * 7/1998 | Larabell ....................... 710/9 |
| 5,793,997 A | 8/1998 | Briggs ........................ 395/309 |
| 5,819,107 A | 10/1998 | Lichtman et al. ........... 395/828 |
| 5,832,238 A | 11/1998 | Helms ........................ 395/285 |
| 5,857,083 A | 1/1999 | Venkat ....................... 395/309 |
| 5,889,965 A | 3/1999 | Wallach et al. ............. 395/283 |
| 5,974,544 A | * 10/1999 | Jeffries et al. ................ 713/1 |
| 6,058,445 A | 5/2000 | Chari et al. ................. 710/103 |
| 6,134,616 A | 10/2000 | Beatty ........................ 710/104 |
| 6,148,355 A | * 11/2000 | Mahalingam ................ 710/104 |
| 6,175,932 B1 | * 1/2001 | Foote et al. .................... 714/9 |
| 6,192,434 B1 | * 2/2001 | Wallach et al. ............. 710/103 |

OTHER PUBLICATIONS

Bakke, B.E. et al., "Method for Atomic Peer–to–Peer Communication on a Peripheral Component Interconnect Bus", *IBM® Technical Disclosure Bulletin*, vol. 39, No. 01 (Jan. 1996).

"AS/400 Advanced Series 9404/9406 Models 5xx Problem Analysis, Repair and Parts", *International Business Machines Doc. No. SY44–4951–01*, (1996).

* cited by examiner

*Primary Examiner*—Frantz B. Jean
(74) *Attorney, Agent, or Firm*—Wood, Herron & Evans, LLP

(57) ABSTRACT

An apparatus, program product and method of replacing a failed hardware device in a computer each rely solely on program code and/or other computer facilities that are ensured of being available in the computer during a concurrent maintenance operation, so that, even in the event that a failure occurs in such a hardware device, successful performance of the concurrent maintenance operation is ensured. For example, the initiation of power up and power down functions necessary to permit replacement of a failed device may be performed through a control panel or other similar facility in a computer that is continuously available when a computer is in a fully or partially active and powered-on state. Also, a concurrent replacement operation may be supported that automatically detects a lock-up condition resulting from a failed attempt to access data using a failed hardware device, and that, upon replacement of the device with a suitable replacement device, automatically associates a resource that was previously associated with the failed device with the replacement device such that the failed attempt to access data may be automatically resumed, thereby automating the recovery from the lock-up condition.

30 Claims, 15 Drawing Sheets

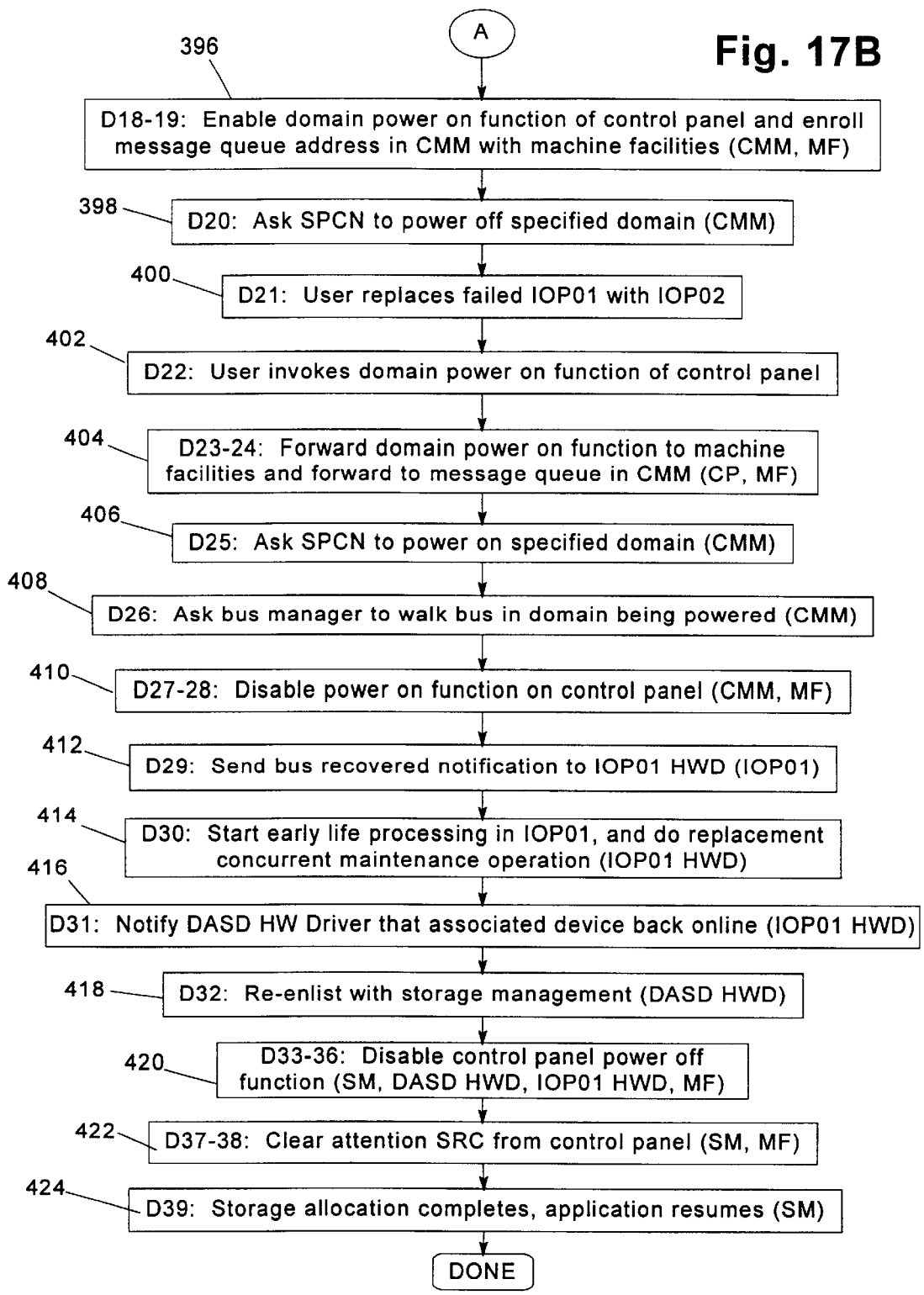

APPARATUS, PROGRAM PRODUCT AND METHOD OF REPLACING FAILED HARDWARE DEVICE THROUGH CONCURRENT MAINTENANCE OPERATION

CROSS-REFERENCE TO RELATED APPLICATIONS

This application is related to U.S. patent application Ser. No. 09/106,949, filed Jun. 30, 1998 on even date herewith by Curtis S. Eide et al., and entitled "APPARATUS, PROGRAM PRODUCT AND METHOD OF MANAGING COMPUTER RESOURCES SUPPORTING CONCURRENT MAINTENANCE OPERATIONS," which application is incorporated by reference herein.

FIELD OF THE INVENTION

The invention is generally related to computers and computer software. More specifically, the invention is related to concurrent maintenance of computers and the like.

BACKGROUND OF THE INVENTION

Computer downtime, or the period of time in which a particular computer is unavailable for use, often raises significant concerns in a number of computer applications. For single-user computers, computer downtime may only inconvenience the primary users of the computers. However, for multi-user computers such as mainframe computers, midrange computers, supercomputers, network servers, and the like, the inability to use a particular computer may have a significant impact on the productivity of a relatively large number of users, particularly in mission-critical applications. A large proportion of multi-user computers are used around the clock, and as a result, it is often critically important that these computers be available as much as possible.

However, multi-user computers, like anything else, need to be maintained from time to time. Components may fail and need replacement. Also, as the workload of a computer increases, additional components may need to be added. Furthermore, as technology advances, new and improved components may become available. With many conventional computers, however, many of these operations require that the computers be shut down and made unavailable while maintenance is being performed.

To address the problems associated with computer downtime, significant development efforts have been made in the area of concurrent maintenance. Concurrent maintenance is a process by which maintenance of a computer occurs while the computer is running, and with minimal impact on user accessibility.

For example, a number of computer interfaces have been proposed and/or implemented in the area of "hot swappability", whereby components may be installed and/or removed from a computer without having to shut down and/or restart the computer. For example, a Peripheral Component Interconnect (PCI) hot plug specification has been defined to permit electronic components to be installed and/or removed from a PCI bus implemented in a computer.

A PCI bus is typically a high speed interface between the processing complex of a computer and one or more "slots" that receive printed circuit boards known as interface or adapter cards. The cards typically control hardware devices that are either disposed on the cards or are coupled thereto through dedicated cabling. Any number of hardware devices may be coupled to a computer in this manner, including computer displays, storage devices (e.g., disk drives, optical drives, floppy drives, and/or tape drives), workstation controllers, network interfaces, modems, and sound cards, among others. The PCI hot plug specification permits individual slots on a PCI bus to be selectively powered off to permit cards to be removed from and/or installed into the slots.

One problem, however, with the PCI hot plug specification, as well as other concurrent maintenance implementations, is that often additional steps such as manual reconfiguration and/or partial or total system restart are required. Specifically, updates are often required to the computer programs that function as the interfaces between the computer and various hardware devices.

Using such interface computer programs, for example, enables the complexity and specifics of a particular hardware device to be effectively hidden from another computer program wishing to use the device. In many environments, the computer programs that interface hardware devices with computers are referred to as "resources" (which are also referred to in some environments simply as hardware drivers, device drivers, or input/output (I/O) drivers, among others). Often a resource is implemented within the operating system of the computer, and thus resides between the hardware devices and the computer applications that use such hardware devices.

By using a resource to interface a hardware device with a computer, a computer application that wishes to access the hardware device can do so through a common set of commands that are independent of the underlying specifics of the hardware device. For example, a resource associated with a disk drive controller may provide a set of commands such as "open file", "read data", "write data" or "close file" that can be called by any computer application that wishes to perform an operation on a disk drive coupled to the controller. It does not matter to the computer application that the disk drive controller is installed in slot 3 or slot 4, or that the controller adheres to the Small Computer Systems Interface (SCSI) or Integrated Drive Electronics (IDE) standard to transmit information between the disk drive and the controller. Moreover, if the computer application wishes to access another disk drive, the same set of generic commands may often be used even if the other disk drive is significantly different from the first.

However, different hardware devices typically do require specific operations to be performed in response to the generic commands issued by a computer application. Thus, a resource is often required to perform device-specific operations for a particular device in order to handle a generic command requested by a computer application. In conjunction with these tasks, the resource typically maintains device-specific information such as the location of the hardware device, the type of device, and other device characteristics.

Typically, a resource has, among other information, some form of indication that identifies the resource to the computer applications, generally referred to herein as a resource identifier. A resource may also have some form of indication as to where in the computer the hardware device associated with the resource is located (e.g., at a particular bus location, in a particular slot, etc.), also referred to herein as a location identifier. Furthermore, a resource may have some form of indication that uniquely identifies the hardware device associated with the resource to distinguish that device from other devices that may or may not be installed in the computer, also referred to herein as a device identifier.

Conventional concurrent maintenance implementations typically have no manner of automatically reconfiguring a resource in response to a change in the status of the hardware device associated with the resource. Therefore, when a hardware device is installed, removed or replaced, any resource associated with the hardware device often must be manually reconfigured by a system operator (e.g., by manually updating one or more system configuration files associated with the resource). Often, this also requires individual computer applications that rely on a resource to also be manually reconfigured. Such reconfigurations often require the resource and/or computer applications relying on the resource to be temporarily inaccessible to users, thereby extending the downtime associated with conventional concurrent maintenance implementations. Otherwise, automatic reconfiguration may be supported, but only after the computer, or at least the operating system of the computer, is restarted—a process that can often be slow and time consuming.

Another problem associated with conventional concurrent maintenance implementations is that often failure of a particular hardware device can prevent initiation of and/or performance of concurrent maintenance operations. For example, in some conventional implementations, some user interaction through a display or terminal user interface is required to perform operations such as powering down or powering up a bus or slot therein to which a particular hardware device is attached. For single-user computers, for example, the display user interface may be a computer monitor that displays information to a user. For a multi-user computer, the display user interface may be a separate workstation or terminal that is interfaced with the computer.

In many computers, however, failure of some hardware devices may cause some functions in the computers to "lock-up", or halt operation, as a result of uncompleted accesses to failed hardware devices. For example, some computers may not permanently maintain in main storage the program code necessary to operate the display user interface. Instead, such program code may be permanently maintained in an external storage device and swapped into and out of main storage from time to time as needed by the computer, a process generally known as "paging." Whenever program code is stored in the main storage, such program code is also referred to as being "resident" in the computer.

Whenever a hardware device associated with such an external storage device (e.g., a controller) fails, it may not be possible to "page in" the program code for operating the display user interface. As a result, it may not be possible to interface with the computer through the display user interface. Any concurrent maintenance operation that is accessed through the display user interface of the computer, therefore, could not be initiated, and the computer would be irretrievably locked-up, requiring a time consuming full restart of the computer. In addition, with some computers, restarting the computer after a lock-up condition (often referred to as an "abnormal shutdown) may even take longer than after a normal shutdown, as processing must often be performed to restore the computer to a coherent state (if possible), including storage management directory recovery, mirrored DASD synchronization, etc.

Therefore, a significant need exists for a manner of supporting concurrent maintenance in a computer without requiring manual reconfiguration and/or a time consuming system restart to update the resources utilized by computer applications executing in the computer, and/or the applications themselves. Moreover, a significant need exists for a manner of supporting such concurrent maintenance operations that is not reliant on non-resident program code, so that the availability of such operations is not compromised.

SUMMARY OF THE INVENTION

The invention addresses these and other problems associated with the prior art by providing an apparatus, program product and method of replacing a failed hardware device in a computer that rely solely on program code and/or other computer facilities that are ensured of being available in the computer during a concurrent maintenance operation, so that, even in the event that a failure occurs in such a hardware device, successful performance of the concurrent maintenance operation is ensured. For example, the initiation of power up and power down functions necessary to permit replacement of a failed device may be performed through a control panel or other similar facility in a computer that is continuously available when a computer is in a fully or partially active and powered-on state.

Furthermore, in some embodiments, the detection of and recovery from a failure in a hardware device may be implemented in a highly automated fashion. Specifically, a concurrent replacement operation may be supported that automatically detects a lock-up condition resulting from a failed attempt to access data using a failed hardware device. Then, upon replacement of the device with a suitable replacement device, a resource that was previously associated with the failed device may be automatically associated with the replacement device such that the failed attempt to access data may be automatically resumed, thereby automating the recovery from the lock-up condition.

In either instance, the amount of computer downtime required to perform a concurrent maintenance operation is minimized, thereby ensuring less interruption of service for users. Moreover, much of the manual configuration that would otherwise be required may be reduced or eliminated, thereby facilitating system maintenance.

Therefore, consistent with one aspect of the invention, a failed hardware device is replaced in a computer, with the failed hardware device having associated therewith a resource that interfaces the failed hardware device with at least one application executing in the computer. Power is removed from the failed hardware device in response to user input received through a control panel on the computer. After user replacement of the failed hardware device with a replacement hardware device, power is supplied to the replacement hardware device in response to user input received through the control panel. Moreover, the resource is automatically associated with the replacement hardware device after power is supplied to the replacement hardware device.

Consistent with another aspect of the invention, a failed controller for an external storage device coupled to a computer over a bus is replaced, with the failed controller having associated therewith a resource that presents a uniform interface to at least one application on the computer. A lock-up condition is detected in the computer resulting from a failed attempt to access data with the external storage device. In response to detection of the lock-up condition, a user is enabled to replace the failed controller with a replacement controller. After replacement of the failed controller with a replacement controller, the resource is automatically updated to associate the replacement controller with the resource, and after the resource is updated, the lock-up condition is recovered from by automatically resuming the failed attempt to access data with the external storage device.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 17A and 17B are flowcharts illustrating the program flow of the software components in FIG. 16 during detection of a failure in, and replacement of, a failed hardware device.

DETAILED DESCRIPTION

Hardware and Software Environment

Figure 1:
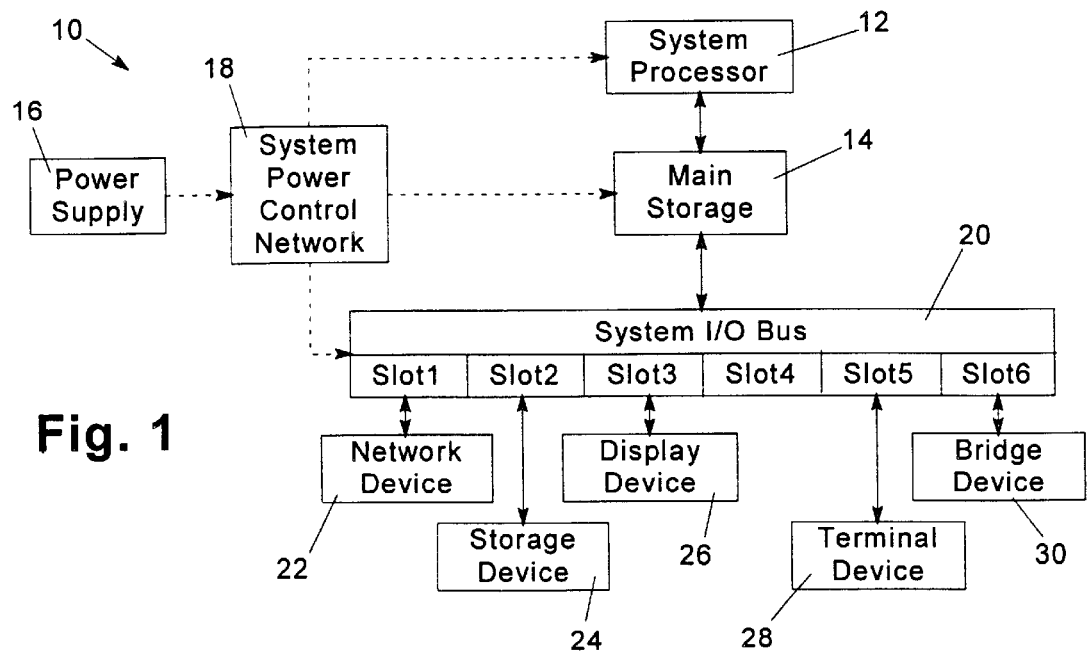
FIG. 1 is a block diagram of a computer system consistent with the invention.

Turning to the Drawings, wherein like numbers denote like parts throughout the several views, FIG. 1 illustrates an apparatus 10 consistent with the invention. Apparatus 10 will hereinafter also be referred to as a "computer" or "computer system", although it should be appreciated the term "apparatus" may also include other suitable programmable electronic devices consistent with the invention. For the purposes of the invention, apparatus 10 may represent practically any type of computer, computer system or other programmable electronic device, including a client, or single-user, computer such as a workstation, desktop computer or portable computer; or a multi-user computer such as a mainframe computer, a midrange computer, a supercomputer, or a network server, among others. Apparatus 10 may be coupled to other electronic devices over a network, or may be a stand-alone device in the alternative.

Apparatus 10 includes a processing complex including a system processor 12 coupled to a main storage 14. In the illustrated embodiment, apparatus 10 is an AS/400 midrange computer available from International Business Machines Corporation. However, it should be appreciated that any number of alternate environments may utilize the concepts disclosed herein, and thus, the invention should not be limited to use with any particular computing environment.

Processor 12 may represent one or more processors (e.g., microprocessors), and main storage 14 may represent the dynamic random access memory (DRAM) devices comprising the primary work space of apparatus 10, as well as any supplemental levels of memory, e.g., cache memories, non-volatile or backup memories (e.g., programmable or flash memories), read-only memories, etc. In addition, main storage 14 may be considered to include memory storage physically located elsewhere in apparatus 10, e.g., any cache memory in a processor 12, as well as any storage capacity used as a virtual memory, e.g., as stored on a storage device coupled to the computer.

Apparatus 10 is powered by a power supply, illustrated at 16, that supplies power to various components in the apparatus through a system power control network (SPCN) 18. SPCN 18 is capable of selectively providing power to the various components in apparatus 10, including selectively supplying power to a system input/output (I/O) bus illustrated at 20.

System I/O bus 20 is coupled to the processing complex of processor 12 and main storage 14, and provides an interface with various hardware devices, e.g., as illustrated at 22–30. Bus 20 typically includes a plurality of slots (slots 1–6 being illustrated as an example in FIG. 1) that receive interface or adapter cards that control and/or provide an interface with the various hardware devices. The plurality of slots define the available locations at which hardware devices may reside on the bus.

It should be appreciated that apparatus 10 may include multiple buses, as well as extensions and interfaces to additional buses for connecting with additional hardware devices. Moreover, it should be appreciated that the invention should not be limited to use in the bus and slot environment disclosed herein. Rather, any combination of single- and/or multi-drop interconnections that define multiple locations at which hardware devices may be installed in apparatus 10 may be used as an environment for providing concurrent maintenance consistent with the invention.

In addition, any number of hardware devices may be coupled to bus 20 consistent with the invention. For example, a network interface may be provided by a network adapter card 22, e.g., to provide communications capability using any number of network protocols (e.g., IPX, TCP/IP, SNA, etc.). Also, an interface may be provided to a storage device 24 such as a DASD, an optical drive, a floppy drive, a hard disk drive, and/or a tape drive, as well as to a display device 26 such as a video display, an LCD panel, etc. (e.g., through a graphics or video adapter card). Also, control over terminals such as attached workstations may be provided by a terminal device 28, and an interface to an expansion bus may be provided by a bridge device 30. It should be appreciated that practically any other programmable electronic device that is capable of interfacing and communicating with apparatus 10 may be used as a hardware device consistent with the invention.

Apparatus 10 generally operates under the control of an operating system, and executes various computer software applications, components, programs, objects, modules, etc. Moreover, various applications, components, programs, objects, modules, etc. may also execute on one or more processors in another electronic device coupled to apparatus 10, e.g., in a distributed or client-server computing environment, whereby the processing required to implement the functions of a computer program may be allocated to multiple devices over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Concurrent Maintenance with Automated Resource Configuration

As discussed above, various embodiments of the invention operate by automatically configuring a computer system resource in response to installation of a hardware device associated with the resource. A resource may generally be considered to include any abstraction of a hardware device utilized by computer applications executing on a computer to shield from those applications the underlying mechanisms required to operate and/or interface with that hardware device.

For example, the AS/400 midrange computer utilizes resources to represent the various hardware devices attached to the computer. Computer applications executing on the AS/400 computer direct access requests directly to the resources, and the resources then handle those requests in a suitable manner for the underlying hardware device. In other environments, resources may be referred to in other manners, e.g., as device drivers, as input/output (I/O) drivers, or simply as hardware drivers, among others. Therefore, while the term "resource" is used hereinafter, it should be appreciated that the term also encompasses abstractions used in other environments to implement the same functionalities described herein.

A resource typically has associated therewith a hardware driver that defines the methods necessary to interface with a particular hardware device, as well as some form of data structure that maps a resource identifier for the resource to the hardware driver for the hardware device. In some environments, the data structure is considered part of the hardware driver, so the resource is simply referred to as a hardware, device or input/output driver. Moreover, in some embodiments resources may also be permitted to "share" the same hardware driver and associated data structure so that the same hardware device can be accessed via multiple resources.

Figure 2:
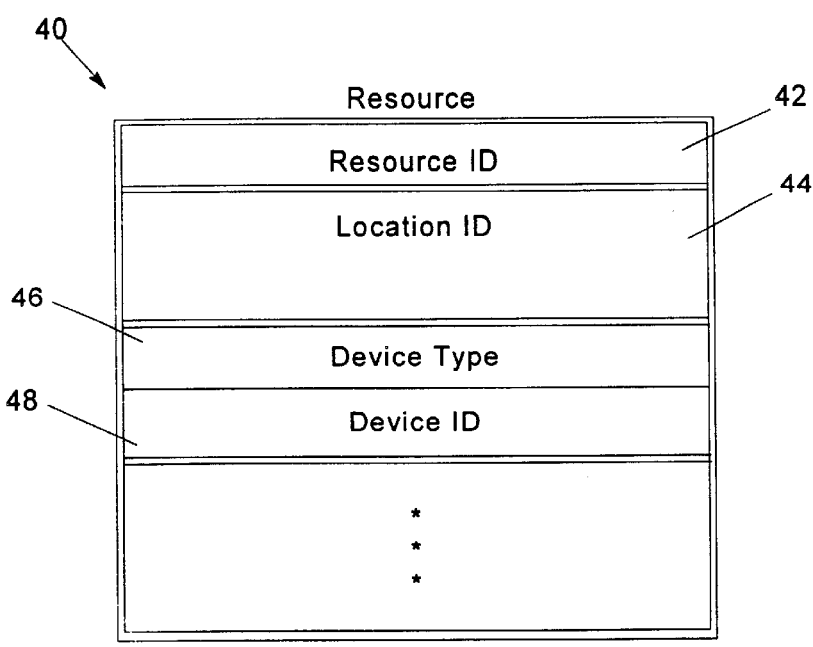
FIG. 2 is a block diagram of an exemplary data structure for a computer system resource consistent with the invention.

As shown in FIG. 2, for example, a resource data structure 40 may include, among other information, a resource identifier 42 that identifies the resource to computer applications and other potential users of the resource on the computer. The resource identifier may include a numerical token and/or a common name more understandable to users.

To map the resource to a hardware device, a location identifier 44, a device type identifier 46 and a device identifier 48 are provided. The location identifier provides an indication of where the associated hardware device is located in the computer, e.g., the bus slot, bus address, or other indicator that distinguishes between a plurality of available locations.

The device type identifier 46 typically identifies a particular class of device, the members of which share identical or nearly identical functional characteristics. Devices with the same type but different models share the same functional characteristics, but differ in non-functional attributes such as performance, cost or capacity. The device type therefore determines what type of hardware driver to associate with a device. As such, the device type may also be considered to be a hardware driver class identifier, whereby multiple physical devices that are capable of using the same class of hardware driver may be considered to have the same device type.

As will become apparent below, the device type in the illustrated embodiment may be used to determine what class, or type, of hardware driver to create for a given hardware device at genesis create time. The device type is also used to determine whether an existing resource in the computer (e.g., at a particular location) can be associated with a given hardware device (e.g., when a replace occurs).

The device identifier 48 for a hardware device typically includes a vendor and/or serial number that distinguishes each individual physical unit from other devices, even from other devices with the same device type. The device identifier is typically stored in non-volatile storage on a particular hardware device unit during production, so that the device is thereafter distinguishable from all other manufactured units.

Embodiments of the invention generally operate by updating the location and/or device identifiers for a resource when appropriate to maintain an association of a resource with a particular hardware device installed in the computer. As a result, during concurrent maintenance operations where the hardware device associated with a particular resource is modified (e.g., by being replaced or moved to a different location, etc.), the resource information is automatically updated as well. Manual reconfiguration of system resources is therefore avoided, and system downtime associated with such concurrent maintenance operations is minimized.

Figure 3:
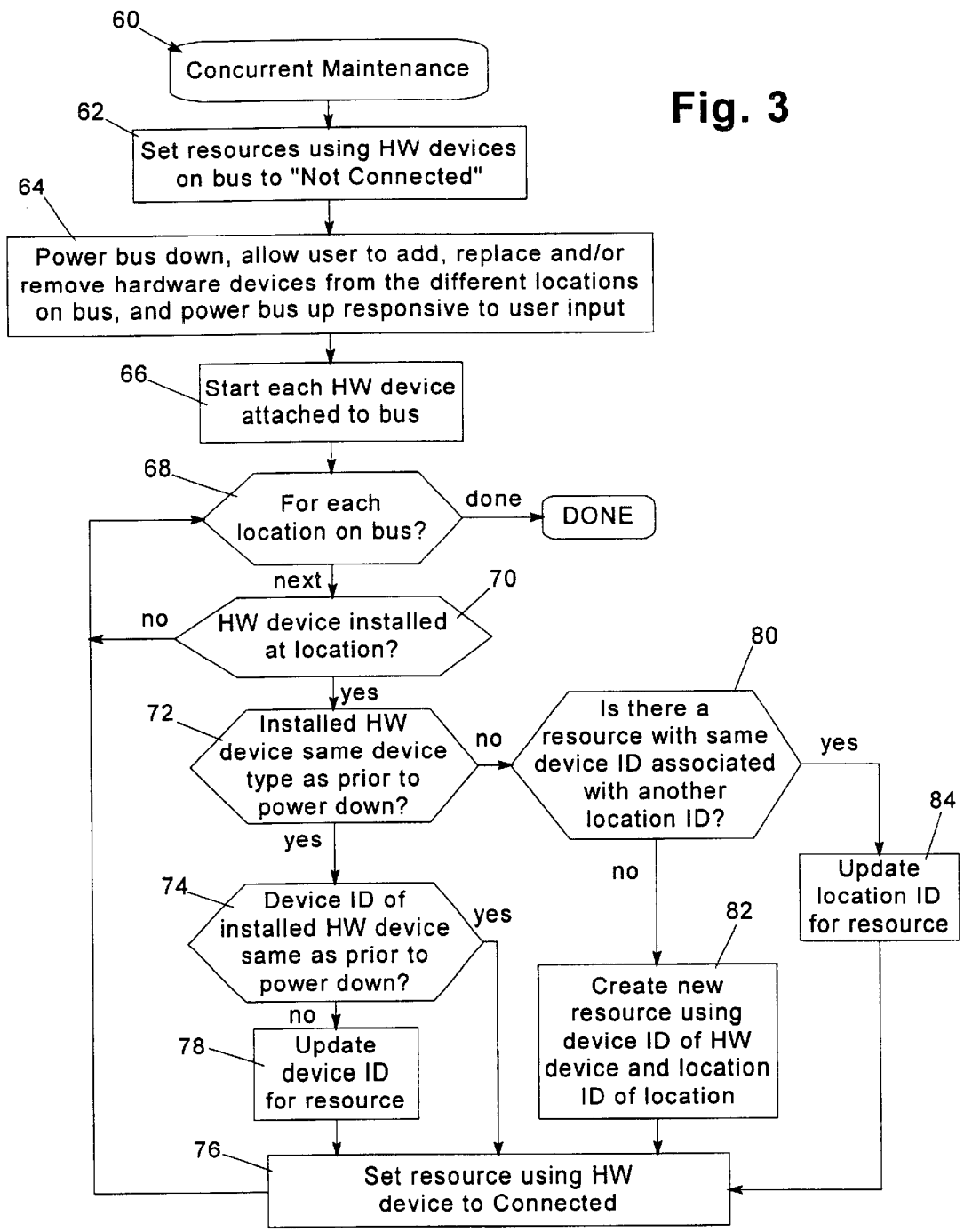
FIG. 3 is a flowchart illustrating the general program flow of a concurrent maintenance routine consistent with the invention.

FIG. 3, for example, illustrates at 60 the general program flow in a concurrent maintenance operation consistent with the invention. First, block 62, the resources using the various hardware devices on the bus are set to "not connected" status to in effect preclude a user application that relies on such a resource from attempting to access the resource during the concurrent maintenance operation. However, it is important to note that typically this entails only restricting an application from performing operations with the resource, and does not require the application to be reconfigured or the computer to be restarted.

Next, the bus is powered down, e.g., in response to a user request to do so via a display or terminal interface, via a control panel, or any other suitable mechanism for receiving user input on a computer. At this time, a user is permitted to add, replace and/or remove any hardware devices from different locations on the bus. Once a user has reconfigured the devices on the bus, power is restored to the bus, e.g., in response to user input provided over a display or terminal interface, or a control panel. In the alternative, in some implementations it may be possible to power down only a specific location (e.g., a slot) at a time, or to perform maintenance operations while power is still being applied at a particular location, whereby powering a location down and back up may not be required.

Five primary operations may be supported. First is that of installing a new hardware device in the computer. A second is that of removing an existing device from the computer. A third is upgrading a device, which is similar in many respects to removing an old device and installing a new device in its place, as an upgraded device will typically require a different hardware driver, and thus, will be treated as a new device on the system. Fourth, a hardware device may be replaced, whereby a given unit is removed and another unit of the same device type, but having a different device identifier, is installed in place of the removed device. A fifth operation is that of moving a device, whereby the device is removed from one location and reinstalled in another location.

A replace operation is restricted to replacement in the same location on the bus. In other embodiments, however, it may be desirable to permit a replacement to occur by removing a device from one location on the bus and replacing it with another device with a like device type at another location on the bus.

Next, in block 66, each hardware device attached to the bus is started, typically performing an initial microcode load (IML) to initialize each device. This operation is similar from the perspective of the device as if the computer itself were being initially powered up.

Next, a FOR loop is initiated in block 68 to process each location on the bus. When each location is processed, routine 60 then terminates.

First, for each location, block 70 determines whether a hardware device is installed at that location. If not, no additional processing is required for that location, and control returns to block 68 to process the next location.

If, however, a hardware device is installed at the location, control passes to block 72 to determine whether the installed hardware device is the same device type as the hardware device that was installed at that location prior to power down. It should be appreciated that, upon powering down of the bus, it may also be necessary to save the status of each hardware device on the bus, although in most embodiments this information will be maintained with each resource in the resource data structure.

If the installed hardware device has the same device type as the device installed in the location prior to power down, control passes to block 74 to determine whether the device identifier of the installed hardware device is the same as that prior to power down. If so, this indicates that no change has occurred with respect to the hardware device installed at that location. As such, control may pass directly to block 76 to set any resource using that hardware device to a "connected" status, prior to passing control to block 68 to process additional locations.

Returning to block 74, if the device identifier of the installed hardware device is not the same as that prior to power down, this indicates that a replacement operation has occurred, with the previous hardware device being replaced by another hardware device of the same device type. Control therefore passes to block 78 to update the device identifier for the resource to reflect that of the newly installed hardware device. The resource identifier and location identifier information for the resource can remain the same. Control then passes to block 76 to set the resource that uses the hardware device to a "connected" status.

Returning to block 72, if the installed hardware device is not the same device type as that prior to power down (which also includes the situation where no hardware device at all was installed in the location prior to power down), control passes to block 80 to determine whether a resource exists having the same device identifier associated with another location identifier. Specifically, block 80 attempts to detect whether a move operation has occurred by virtue of the same hardware device being installed at a different location on the bus. If not, the installed hardware device is new to the computer, and control passes to block 82 to create a new resource using the device type and device identifier of the hardware device and the location identifier of the location being processed. Control then passes to block 76 to set the new resource to a "connected" status.

Returning to block 80, if such a resource having the same device identifier is found, a move operation has occurred, and control passes to block 84 to update the location identifier for the resource, while maintaining the device identifier and resource identifier information in the resource with the same information as prior to power down. Control then passes to block 76 to set the resource to a "connected" status.

Therefore, it should be appreciated that, once reconnected, any resource that is associated with a replaced or moved hardware device can immediately be accessed by other applications on the computer, without any manual reconfiguration of the applications or the resource. Further, while it may be beneficial or necessary in many embodiments to shut down and restart applications to avoid excessive error reporting and recovery, in other embodiments it may not be necessary for applications to be shut down and restarted in response to this operation. In either event, however, the downtime associated with performing the maintenance operations is minimized.

It should be appreciated that various modifications may be made to the general program flow described herein consistent with the invention. For example, rather than sequencing through each location on the bus, separate threads may execute to process each separate location concurrently. Other modifications will be apparent to one of ordinary skill in the art.

Figure 4:
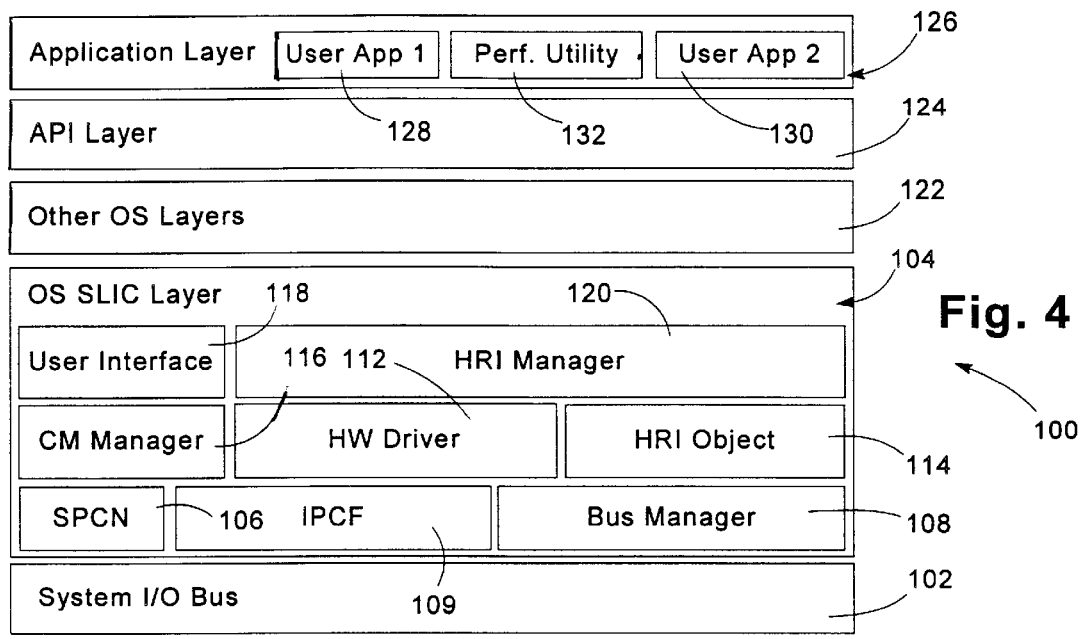
FIG. 4 is a block diagram of the primary software components used in an exemplary computer environment that supports concurrent maintenance consistent with the invention.

Turning now to FIG. 4, one specific implementation of the invention in the environment of an AS/400 midrange computer 100 is described. Computer 100 includes a plurality of software components, including a system input/out (I/O) bus 102 defining the physical interface between the computer and various hardware devices. The hardware devices may be any of the aforementioned categories of devices. In this implementation, each hardware device is represented by an input/output processor (IOP) that interfaces with an external device such as a workstation controller, a storage device, a network interface, etc. It is with each IOP that the processing complex of computer 100 communicates, and thus, each IOP is considered to be a hardware device in this implementation.

Interfaced with the system I/O bus 102 is a system licensed internal code (SLIC) layer 104 for the operating system of computer 100. Within this layer is defined at least a portion of the software in system power control network 106, as well as a bus manager 108 and an interprocess communications function (IPCF) 109 that handle the low-level communications with devices over I/O bus 102. An IPCF object is associated with each location in computer 100, i.e., with each available slot.

Layered on top of components 106, 108 and 109 are the resources, each including a hardware driver 112 that provides a functional abstraction of the associated device and a hardware resource information (HRI) object 114 that serves as a repository of information about the associated resource. In addition, a concurrent maintenance (CM) manager 116 is used to handle concurrent maintenance operations in response to user input supplied through a user interface 118. A hardware resource information (HRI) manager 120 maintains a global view of all resources in the system and manages the mappings between resources and hardware devices in a manner which will become more apparent below.

Layered over the SLIC layer 104 are other operating system layers, illustrated at 122, that are not relevant to an understanding of the invention. Moreover, in some embodiments an application programming interface layer 124 is layered over the operating system. An application layer 126 interfaces with layer 124 (if such a layer is provided) as well as with the other services provided by the operating system, including the hardware drivers provided therein. In this exemplary implementation, three applications, 128, 130 and 132 are illustrated as resident in the application layer 126. Applications 128 and 130 are illustrated as user applications, while application 132 is illustrated as a performance utility that may also rely on one or more resources resident in computer 100.

Figure 5:
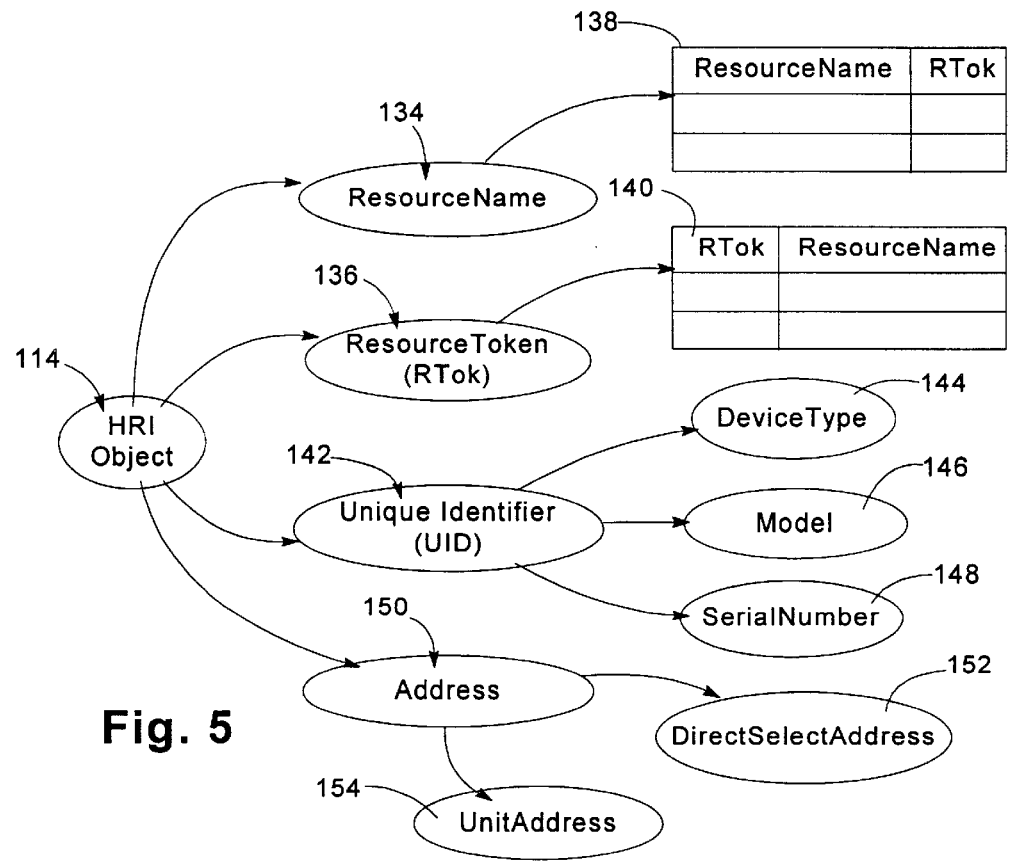
FIG. 5 is a block diagram of an exemplary data structure for the HRI object of FIG. 4.

FIG. 5 illustrates in greater detail the data structure of HRI object 114. A resource identifier is maintained in object 114 via a resource name 134 and a resource token (RTOK) 136.

The resource name provides a human-readable identifier for a given resource to facilitate user selection of different resources. The resource token, on the other hand, is used to identify each resource internally within the computer, and thus, may be a numeric and/or alphanumeric machine-readable identifier that is passed by various software components to identify a particular resource. Object 134 points to a resource name—RTOK conversion map 138 in HRI manager 120, and object 136 points to a RTOK—resource name conversion map 140 in the HRI manager, to facilitate translation between a resource name and resource token. It should be appreciated that either the resource name or resource token may be omitted in other implementations.

Object 114 also includes a unique identifier (UID) object 142 that defines the device identifier for a given hardware device. Any number of parameters for a given hardware device may be maintained in the device identifier, so long as such parameters uniquely distinguish the hardware device from all other hardware devices. For example, in the exemplary implementation, a device type object 144 and a model object 146 may be stored to identify the type and model of a hardware device.

In the illustrated embodiment, objects 144 and 146 may also be used together to define the device type for a given hardware device. Also, in some embodiments, the model of a given hardware device may not be used to identify the device type thereof, since the model often defines non-functional attributes of a device. It should also be appreciated that the device type information for a given hardware device need not be stored in HRI object 114 in some embodiments, given that the identity of the hardware driver itself may be used to identify the device type associated with the resource. Other manners of distinguishing different device types may also be used in the alternative.

Object 148 is also utilized by UID 142 to provide a serial number that provides a unique identification of the hardware device unit. Other unique identifiers may be used in the alternative (e.g., production number, vendor ID number, manufactured date/time, etc.), whether alone or in combination with any of the type and/or model information also available for a given hardware device.

Object 114 also includes a location identifier, which in the exemplary implementation is defined by address object 150 that includes a direct select address object 152 and unit address 154. The direct select address indicates bus and bus slot, and the unit address indicates location in a local address space. For example, for an input/output processor (IOP) hardware device such as a SCSI device, the unit address may indicate the IOP local address space, including a local bus (e.g., a SCSI bus number), and a location on the local bus (e.g., a logical unit number (LUN)), which can vary depending upon device class. Other manners of defining the location of a particular hardware device in a computer may be used in the alternative, e.g., slot number, node number, etc.

Object 1 14 may also include other information specific to the type of hardware device associated therewith, e.g., hardware-specific performance, capacity or capability attributes. For a storage device, for example, the additional information may include storage capacity. As another example, for a display device, the additional information may include color depth, resolution and refresh rate capabilities.

Figure 6:
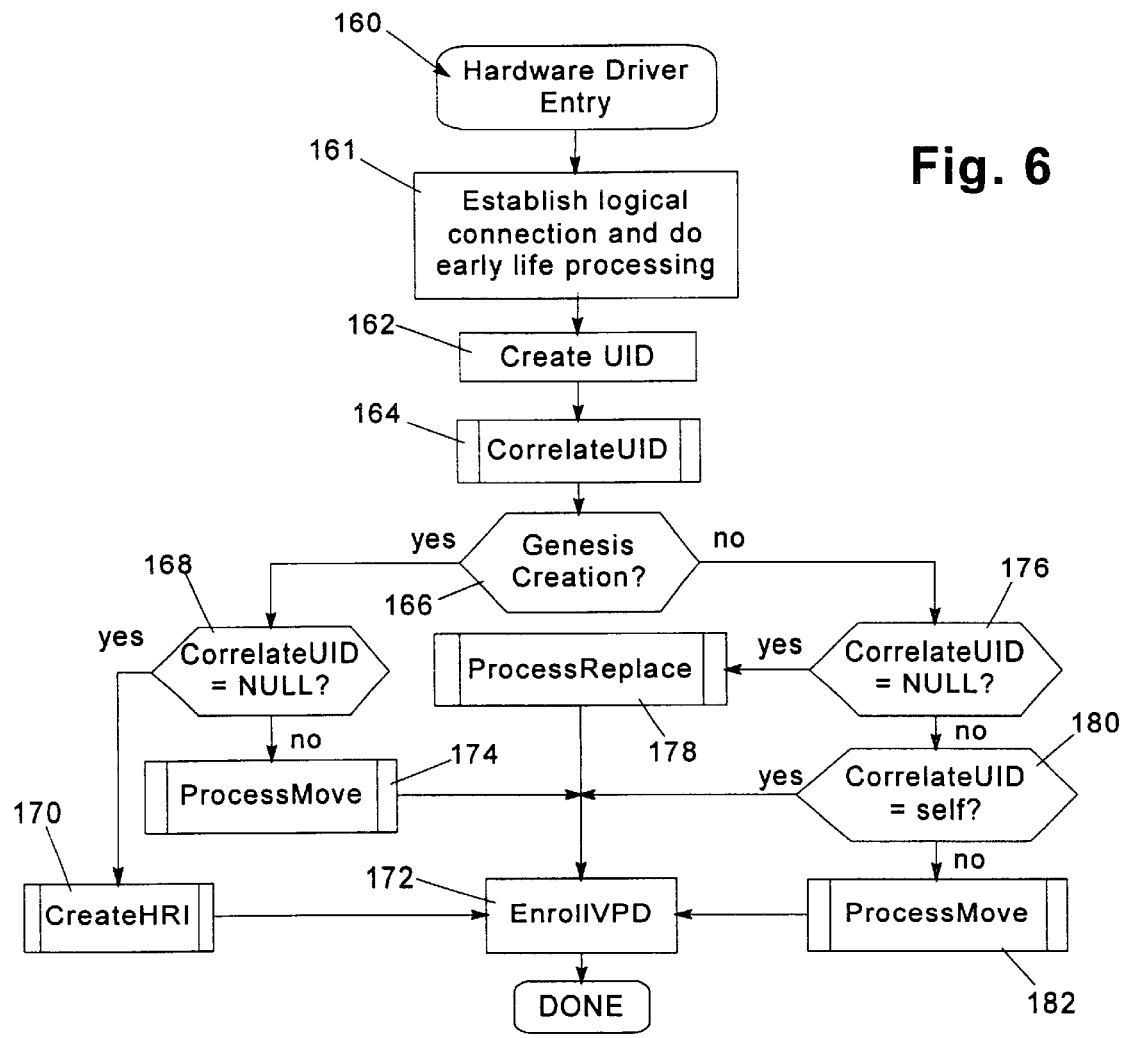
FIG. 6 is a flowchart illustrating the program flow of an entry routine executed by the hardware driver of FIG. 4.

The automated reconfiguration of resource information in computer 100 is principally implemented in the hardware driver 112 of each existing resource. As shown in FIG. 6, for example, a generic hardware driver entry routine is illustrated at 160. Generally, such a routine will be executed whenever (1) the hardware driver is first created, and (2) an existing hardware driver is restarted as a result of powering up the bus. In the first instance, execution of routine 160 is considered to be a "genesis" creation, where the hardware driver is coming into existence for the first time. In the latter instance, a "non-genesis" creation occurs. Typically, a small subset of vital product data (VPD) is passed by the device when first reporting to the system to allow the system to create the correct class of hardware driver. It is at this time that a determination is made as to whether a new hardware driver should be created, or whether an existing hardware driver should be associated with a device.

Routine 160 begins in block 161 by establishing a logical connection with the IPCF object for the location at which the IOP associated with the hardware driver is located. In addition, early life processing is performed to retrieve the full VPD from the hardware device (referred to in this specific embodiment as an IOP), that is associated with the hardware driver. The vital product data typically includes the device type, model and serial number of the IOP, as well as unit address, manufacturing ID, and device attributes and/or characteristics such as density, cache size, etc.

Next, in block 162, routine 160 creates the UID for the IOP from the vital product data. Next, block 164 invokes a correlate UID function to determine whether a resource exists that is mapped to the UID for the IOP. The correlate UID function is typically performed in HRI manager 120 (FIG. 4), and is passed the UID to correlate. The HRI manager typically relies on a UID map or table that includes a plurality of entries, with each entry mapping a UID to a particular hardware driver pointer. Thus, the correlate UID function merely determines whether an entry for the UID passed by the calling routine exists in the table, and if so, returns the hardware driver pointer from the map. If no such entry exists in the table, a "NULL" value is returned.

Returning to FIG. 6, once the correlate UID function has been performed, control passes to block 166 to execute one of two paths, depending on whether a "genesis" creation has occurred (i.e., whether this is the first execution of routine 160 during the life of the hardware driver). The genesis determination functions in this implementation as the determination of whether the device type of a hardware device installed at a particular location is the same as prior to powering down the bus. Specifically, the IPCF object for each location is configured to check if the device type of the IOP matches that of the IOP (if any) previously installed at that location. If so, the IPCF notifies the hardware driver associated with the location prior to power down to in effect invoke a non-genesis creation. If the device does not match, a new hardware driver is created, with this creation serving as a genesis creation. It should also be appreciated that separate routines may be used for genesis and non-genesis invocations of the hardware driver in the alternative.

If the driver is newly created, control passes to block 168 to determine whether the pointer returned by the correlate UID function is NULL, indicating no resource currently exists on the computer corresponding to the UID for the hardware device. If a NULL value has been returned, control passes to block 170 to perform a create HRI function that creates a new HRI object using the UID and location information for the IOP, as well as assigning a new token and resource name to the HRI object.

In addition, upon creation, the HRI object asks the HRI manager to add an entry for the new UID to the UID table. Next, as illustrated by block 172, once the new HRI object is created, the hardware driver enrolls the remaining vital product data (e.g., device characteristics/attributes) with the HRI object, whereby the routine is then complete.

Returning to block 168, if the correlate UID function returns a non-NULL pointer, this indicates that a move operation has occurred, and as such, the location identifier for the existing resource is updated at this time to reflect the new location of the IOP, and the hardware driver being genesis created is destroyed. This operation is discussed in greater detail with reference to FIGS. 12 and 13 below, as a move operation requires the cooperation of another hardware driver initially associated with the new location. Upon completion of the move processing, control passes to block 172 to enroll the vital product data, whereby processing by the hardware driver is complete.

Returning to block 166, if routine 160 is not being called as a "genesis" creation event, control passes to block 176 to determine whether the correlate UID function returned a NULL pointer. If so, this indicates that a replacement operation has occurred, and the device identifier for the newly-installed IOP is used to update the resource information to associate the resource with the new IOP. Control then passes to block 172 to enroll the remaining vital product data with the HRI object, and processing by routine 160 is complete.

Returning to block 176, if the correlate UID function returns a pointer to the hardware driver that is executing routine 160, control passes directly to block 172 to enroll the remaining vital product data.

Returning to block 180, if another hardware driver is associated with the UID, control passes to block 182 to perform the same move processing as with block 174, except the hardware driver whose routine is being executed does not delete itself because it is not in genesis creation. Control then passes to block 172 to enroll the remaining vital product data, whereby processing by routine 160 is complete.

Figure 7:
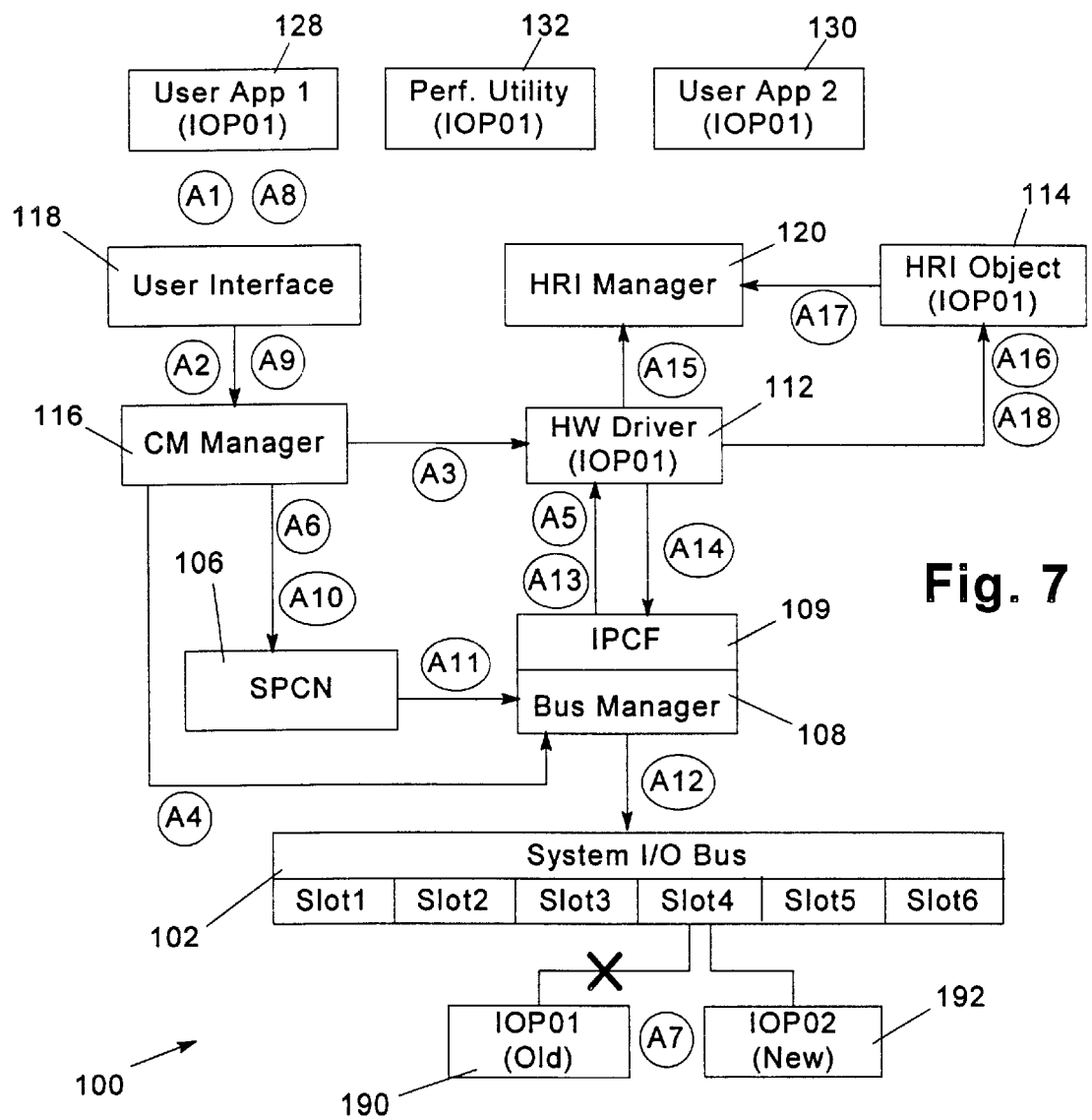
FIG. 7 is a block diagram illustrating the data flow between the software components of FIG. 4 during replacement of a hardware device.
Figure 8:
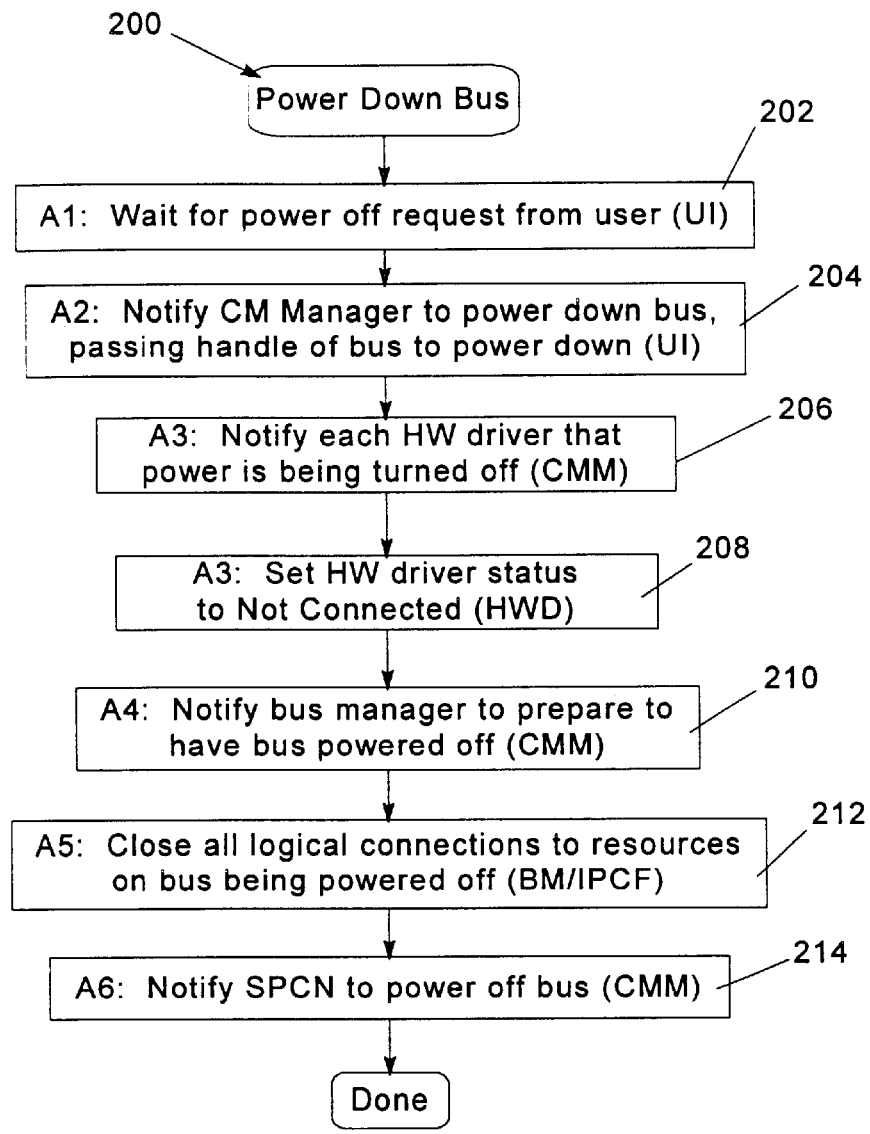
FIG. 8 is a flowchart illustrating the program flow of the software components in FIG. 7 during powering down of the bus.
Figure 9:
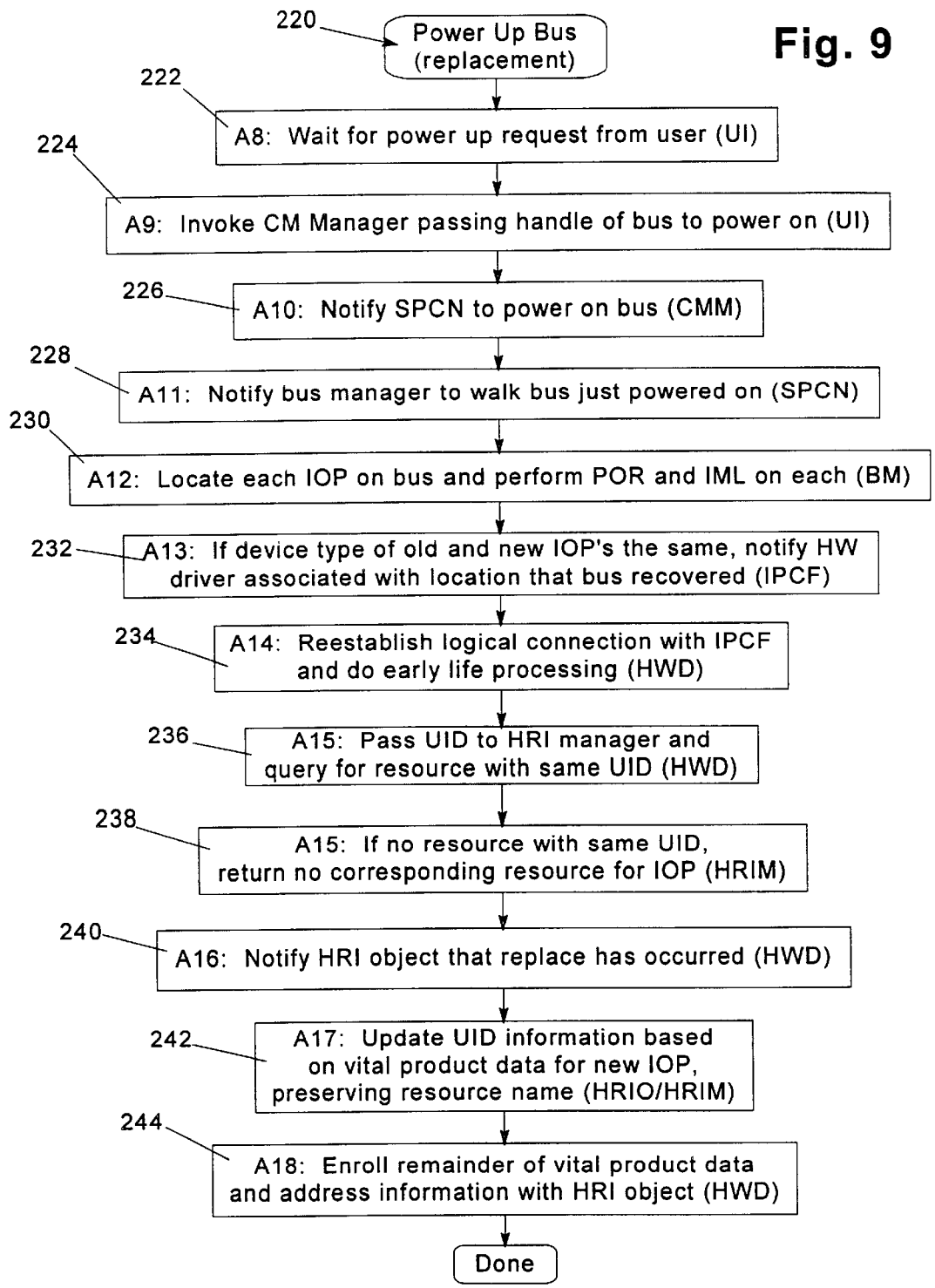
FIG. 9 is a flowchart illustrating the program flow of the software components in FIG. 7 during powering up of the bus after replacement of a hardware device.
Figure 10:
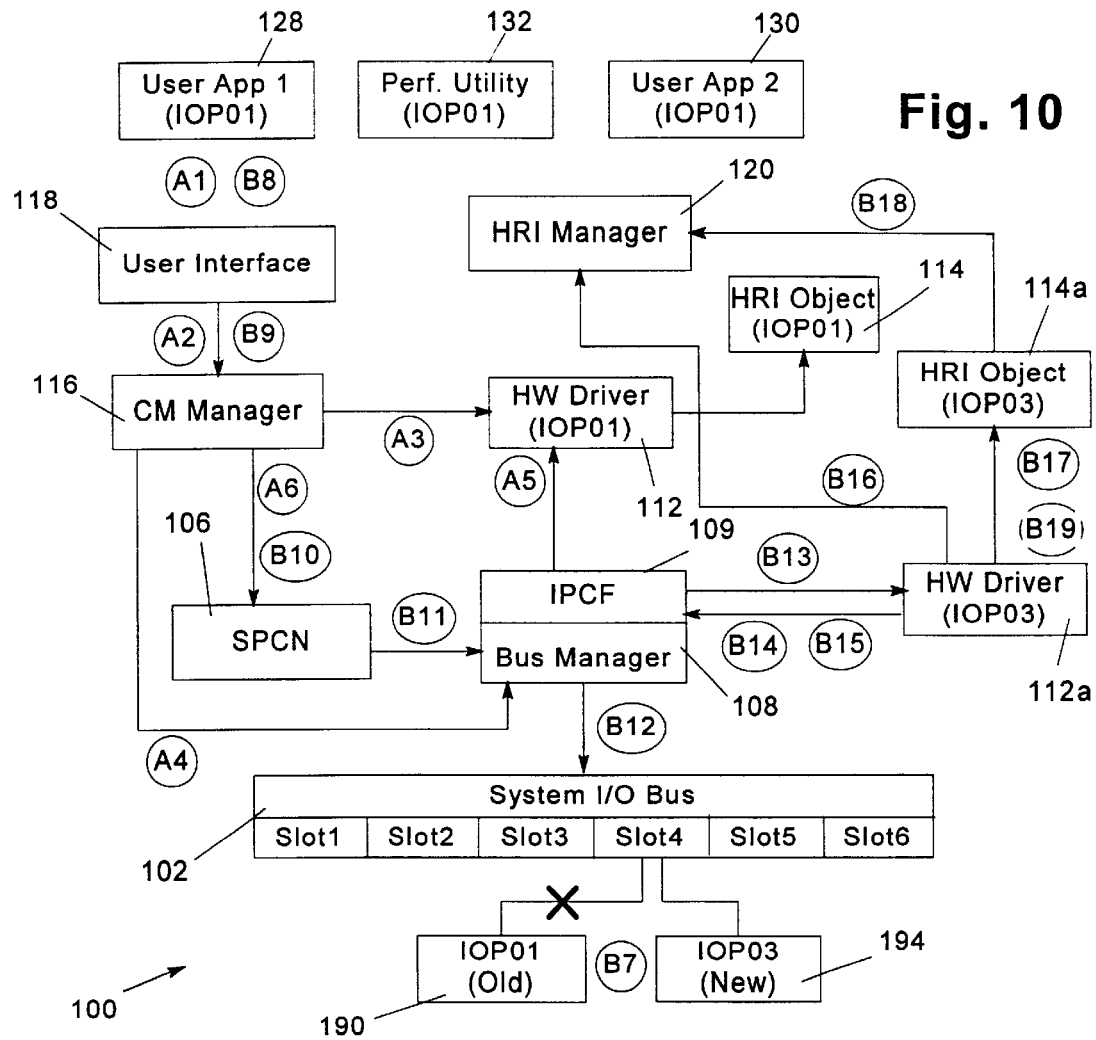
FIG. 10 is a block diagram illustrating the data flow between the software components of FIG. 4 during upgrading of a hardware device.
Figure 11:
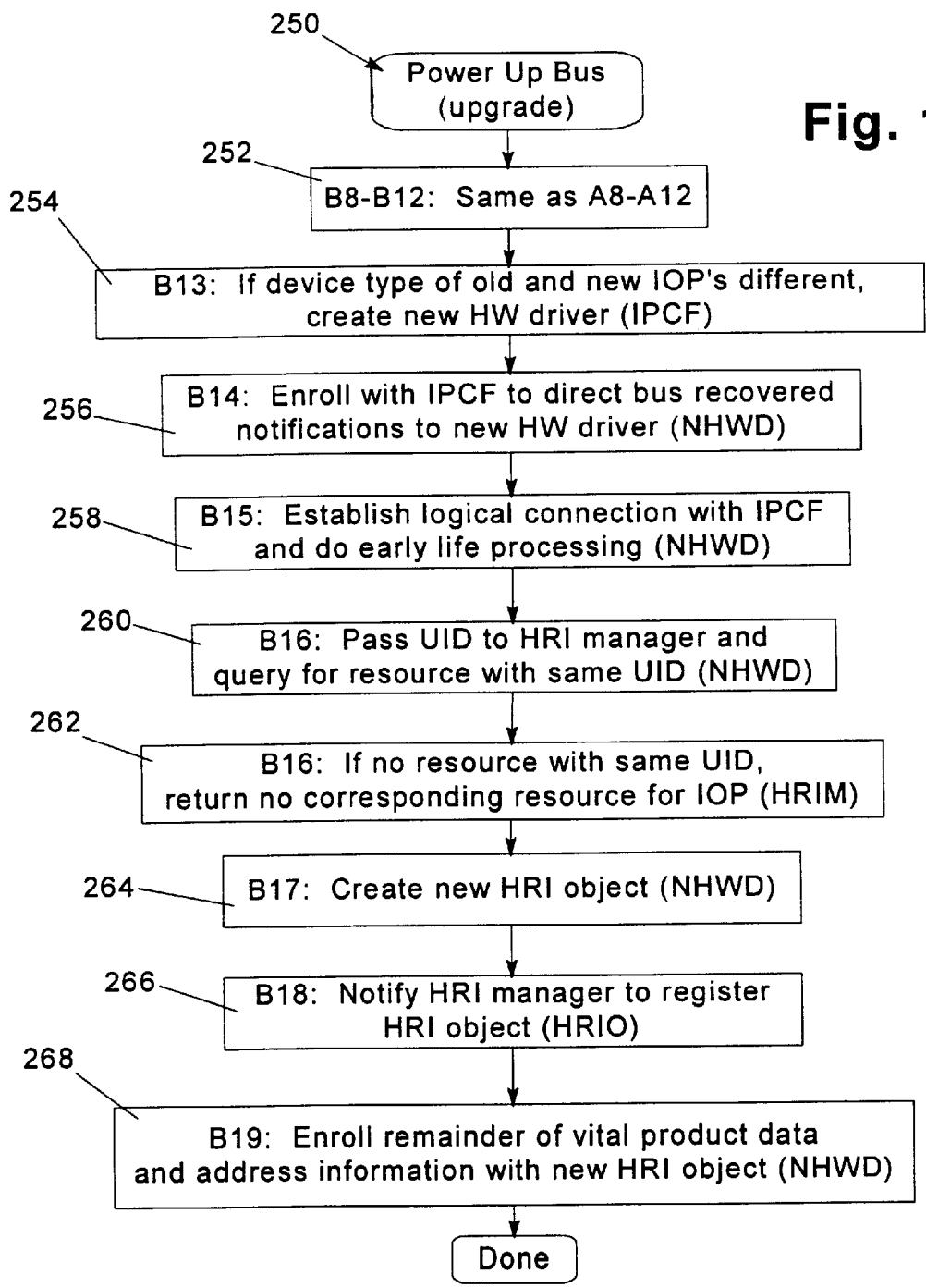
FIG. 11 is a flowchart illustrating the program flow of the software components in FIG. 10 during powering up of the bus after upgrading of a hardware device.
Figure 12:
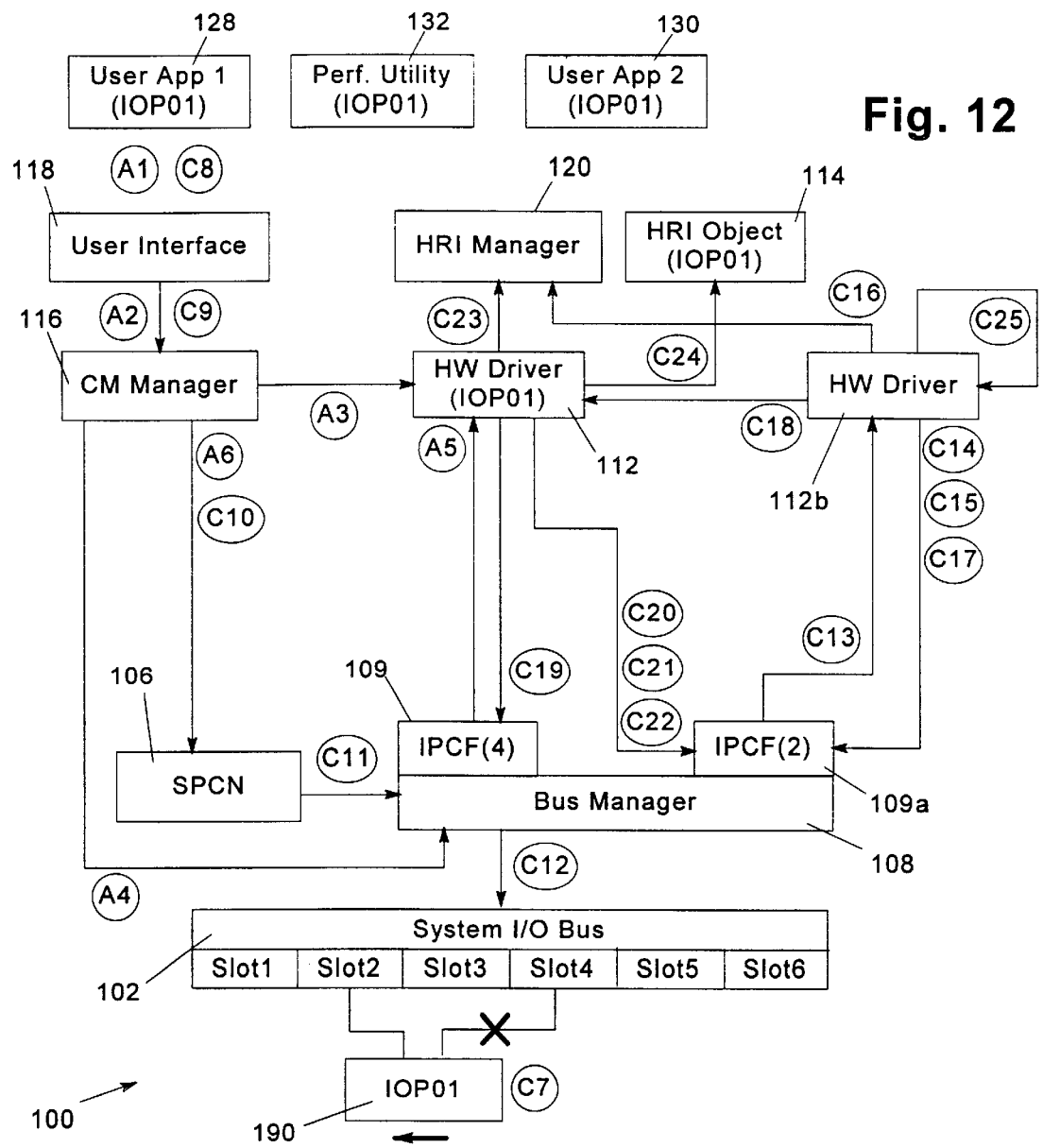
FIG. 12 is a block diagram illustrating the data flow between the software components of FIG. 4 during movement of a hardware device.
Figure 13:
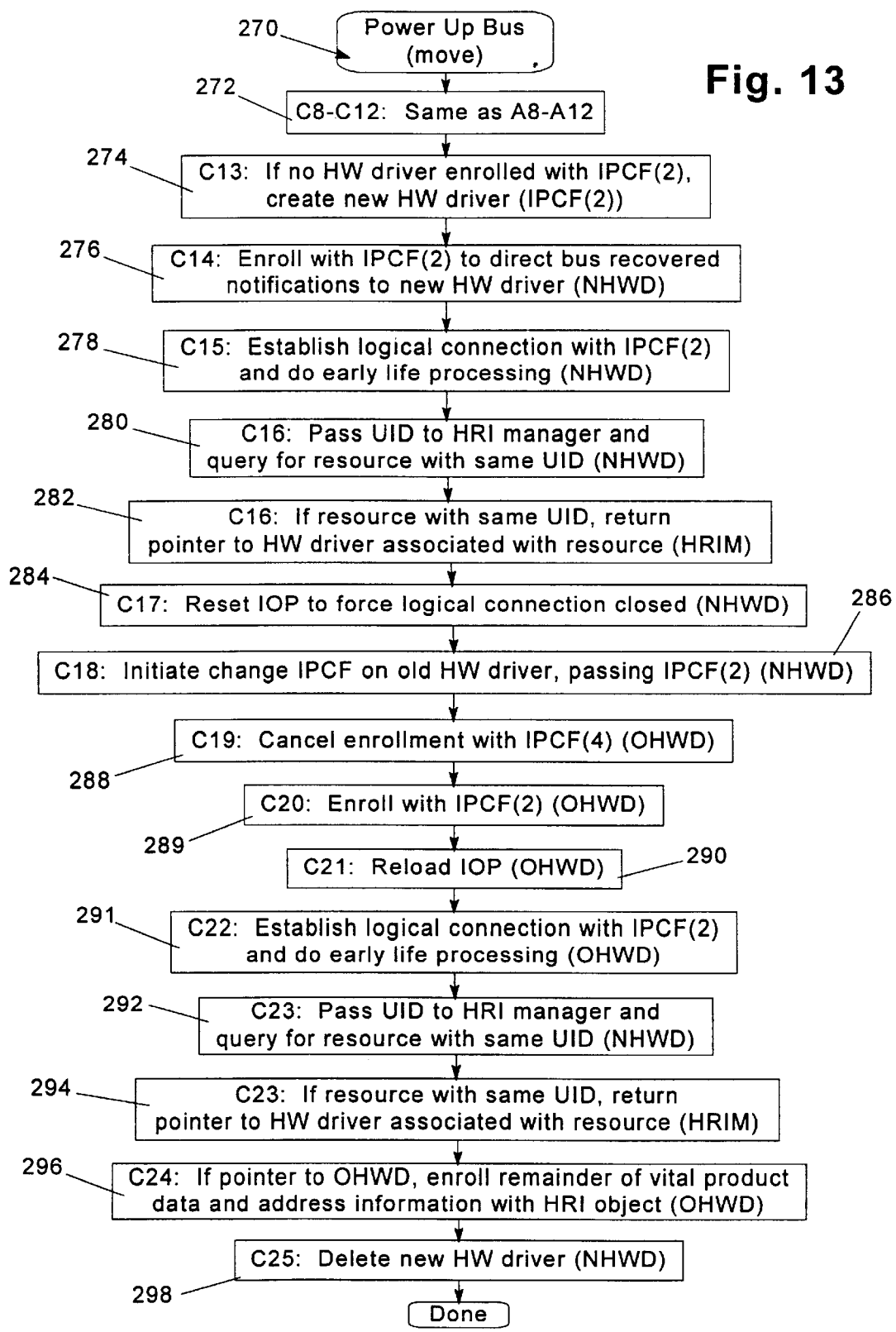
FIG. 13 is a flowchart illustrating the program flow of the software components in FIG. 12 during powering up of the bus after movement of a hardware device.

To better illustrate the operation of the exemplary implementation of the invention, FIGS. 7-13 illustrate various concurrent maintenance operations that may be performed consistent with the invention. Specifically, FIGS. 7-9 illustrate the program flow that would occur in response to replacement of an IOP with another IOP of the same type. FIGS. 10-11 illustrate the program flow that would occur in response to upgrading of an IOP with an IOP of another type. FIGS. 12-13 illustrate the program flow that would occur in response to movement of an IOP to a different slot in the computer. Other maintenance operations may be supported. For example, installation of a new IOP that was not previously resident in the computer would proceed in much the same manner as upgrading a device with an IOP of another type.

FIG. 7 illustrates the data flow that would occur between the various software components in computer 100 during replacement of a first IOP 190 (designated as IOP01) with a replacement IOP 192 (designated as IOP02) into the same slot (Slot 4) of bus 102, and having the same device type as IOP 190.

FIGS. 8 and 9 illustrate respectively the sequence of events occurring during powering down and powering up of system bus 102 during a concurrent maintenance replace operation. To correlate the flow of data and the invocation of methods in the various software components with the various sequence of events that occur during these operations, a sequence of reference numbers A1–A17 are provided in each of FIGS. 7, 8 and 9.

The operations that occur during powering down of the bus are illustrated at 200 in FIG. 8. First, the user interface waits at block 202 (A1) for a power off request to be supplied by the user. Next, in block 204 (A2), the user interface notifies the concurrent maintenance manager to power down the bus, passing to the concurrent maintenance manager the handle of the specific bus to power down. Next, in block 206 (A3), the concurrent maintenance manager notifies each hardware driver associated with IOP's that are resident on the bus being powered down that the bus is about to be powered down. As illustrated in block 208, each hardware driver then sets its status to "Not Connected" (also at A3).

Next, in block 210 (A4), the concurrent maintenance manager notifies the bus manager to prepare to have the bus powered off. In turn, in block 212 (A5), the bus manager and IPCF for each slot close all logical connections to the resources on the bus being powered off. Next, in block 214 (A6), the concurrent maintenance manager notifies the SPCN to power off the bus. The SPCN then powers off the bus and the system waits for a user to install, remove and/or move IOP's to and from the bus while the bus is powered down. Replacement of IOP01 with 1OP02 is illustrated at A7 in FIG. 7.

Now turning to FIG. 9, the sequence of events that occur during powering up of the bus after replacement of a particular IOP with another of the same type is illustrated at 220. First, in block 222 (A8), the user interface waits for a power up request to be supplied by the user, e.g., through a display or terminal interface or through a control panel. Next, in block 224 (A9), upon receipt of such a request, the user interface invokes the concurrent maintenance manager, passing the handle of the bus to power on thereto. Next, in block 226 (A10), the concurrent maintenance manager notifies the SPCN to power the bus on. In response, in block 228 (A11), the SPCN powers on the bus and notifies the manager to "walk" the bus so that each hardware device is started.

In response, in block 230 (A12), the bus manager locates each IOP on the bus and performs a power on reset (POR) and initial microcode load (IML) on each IOP. Next, in block 232 (A13), the IPCF associated with slot 4 determines whether the hardware type of the old and new IOP's are the same. This is determined by the device type read after IML. In the case of replacement, therefore, the IPCF will determine that the device types are the same, and thus, in response, will notify the existing hardware driver associated with that location that the bus has been recovered—essentially invoking routine 160 of FIG. 6 as a "non-genesis" creation event. It should be appreciated that the other IPCF objects associated with each slot concurrently perform similar processing for each IOP installed in the other slots as appropriate.

The program flow then follows the basic program flow described above with reference to routine 160. Specifically, in block 234 (A14), the hardware driver re-establishes the logical connection with the IPCF and does early life processing for the IOP (as with block 161 of FIG. 6).

Next, in block 236 (A15), the hardware driver creates from the vital product data the UID for the IOP and passes the UID to the HRI manager to query for a resource that has the same UID (as with blocks 162 and 164 of FIG. 6). Next, in block 238 (also at A15), the HRI manager determines that no resource exists having the same UID, and as a result, returns a NULL value indicating no corresponding resource exists for the IOP queried therefor. Upon receipt of this information, in block 240 (A16), the hardware driver notifies the HRI object associated with the hardware driver that a replacement has occurred (as a result of following the flow of blocks 166, 176 and 178 of FIG. 6). Then, in block 242 (A17), the HRI object updates the UID information in the object based upon its vital product data retrieved during the early life processing, preserving the resource name for the resource, as well as the location identifier therefor. Next, in block 244 (A18), the hardware driver enrolls the remainder of the vital product data and address information with the HRI object, whereby the HRI object, and thus, the resource, is automatically updated to reflect the replaced device (as with block 172 of FIG. 6). Processing of the power up event is then complete.

FIGS. 10 and 11 illustrate the sequence of events that occur in response to an upgrade of an IOP with another IOP with a different device type (where IOP01 190 is illustrated as removed and IOP03 194 of a different type is inserted in its place). A similar program flow would occur in response to installing an IOP in a slot that was not previously occupied. The power down sequence occurs in the same manner as in the case of replacement of a hardware device, as illustrated by the reference numbers A1–A6. Upgrading IOP01 190 with IOP03 194 is illustrated at B7.

The power up sequence is illustrated at 250 in FIG. 1. Beginning at block 252, the identical processing to blocks 222–230 of FIG. 9 (A8–A12), is performed (B8–B12). Next, in block 254 (B13), the IPCF for slot 4 determines whether the device type of the old and new IOP's are the same. In this case, as they are different, the IPCF associated with the location creates a new hardware driver 112a for IOP03 194, and thus, invokes a "genesis" creation event in driver 112a, processed by routine 160 of FIG. 6. In block 256 (B14), the new hardware driver 112a enrolls with the IPCF to direct any bus recovered notifications associated with the IPCF to the new hardware driver. Next, in block 258 (B15), a logical connection is established with the IPCF, and early life processing with the IOP associated therewith is performed (as with block 161 of FIG. 6). Next, in block 260 (B16), new hardware driver 112a creates a UID for the IOP and passes the UID to the HRI manager to determine whether a resource already exists with the same UID (as with blocks 162–164 of FIG. 6). Since the upgraded device is new to the computer, in block 262 (also at B16), the HRI manager determines that no resource exists with the same UID, a NULL pointer is returned, indicating that no corresponding resource exists for the IOP associated with hardware driver 112a.

Next, in block 264 (B17), new hardware driver 112a creates a new HRI object 114a (following the program flow of blocks 166, 168 and 170 of FIG. 6). In response, at block 266 (B18), HRI object 114a notifies the HRI manager to register the UID thereof with the HRI manager. Next, in block 268 (B19), new hardware driver 112a enrolls the remainder of the vital product data and address information with new HRI object 114a, whereby processing of the upgraded device is complete. It should be appreciated that the old resource may remain in "Not Connected" status for later reuse if the previously installed device is subsequently reinstalled.

FIGS. 12 and 13 illustrate the sequence of events that occur during movement of a IOP01 190 from a first location (slot 4) to a second location (slot 2) (illustrated at C7). As with replacing or upgrading a processor, the same sequence of events for powering down the bus (represented at A1–A6) are performed. Next, as illustrated at 270 in FIG. 13, a power up operation occurs. In block 272, the same sequence of events as blocks 222–230 of FIG. 9 (A8–A12) are performed (C8–C12). Next, in block 274, the IPCF object associated with the slot for the newly-installed IOP (denoted herein as IPCF(2) 109a), creates a new hardware driver 112b for the IOP, as no such driver was associated with IPCF 109a prior to the power down operation (C13).

Next, in block 276 (C14), new hardware driver 112b attempts to enroll with IPCF(2) 109a to direct any bus recovery notifications to the new hardware driver. Next, in block 278 (C15), new hardware driver 112b attempts to establish a logical connection with IPCF(2) 109a and performs early life processing on the associated IOP (as with block 161 of FIG. 6). Next, in block 280, the new hardware driver creates the UID for the IOP and passes the UID to the HRI manager to query for an existing resource with the same UID (C16) (as with blocks 162–164 of FIG. 6). In response, in block 282 (also at C16), the HRI manager determines that a resource does exist with the same UID, and as a result, returns a pointer to the hardware driver associated with the resource (hardware driver 112 of FIG. 12).

Next, in block 284 (C17), new hardware driver 112b resets the IOP to force the logical connection with IPCF(2) 109a closed. Then, in block 286 (C18), new hardware driver 112b initiates a change IPCF operation on the old hardware driver, passing a pointer to IPCF(2) 109a to old hardware driver 112 (with C17–C18 collectively represented by block 174 of FIG. 6, which is executed by following the program flow from blocks 166 and 168). Then, in block 288 (C19), old hardware driver 112 cancels its enrollment with IPCF(4) 109. Then, in blocks 289 and 290 (C20–C21), old hardware driver 112 enrolls with IPCF(2) 109a and reloads the IOP associated with that slot. Then, in block 291 (C22), old hardware driver 112 establishes a logical connection with IPCF(2) and performs early life processing on the IOP (as with block 161 of FIG. 6).

Next, in block 292 (C23), the old hardware driver creates the UID for the IOP and passes such UID to the HRI manager to query for a resource having the same UID (as with blocks 162–164 of FIG. 6). In response, in block 294 (also at C23), the HRI manager determines that a resource exists with the same UID, and returns a pointer to old hardware driver 112. Next, in block 296 (C24), old hardware driver 112 receives the pointer to itself, and as such, can enroll the remainder of its vital product data and address information with the HRI object to update the location identifier therefor (represented by the program flow of blocks 166, 176, 180 and 172 of FIG. 6). The old hardware driver has then been associated with the new location, and any resource associated with the moved device is then updated to reflect movement of the device to a new location.

Next, in block 298 (C25), new hardware driver 112b detects that no IOP is associated therewith. As a result, the new hardware driver terminates and deletes itself. Processing of the movement operation is then complete.

Automated Detection and Recovery from a Hardware Device Failure

Figure 14:
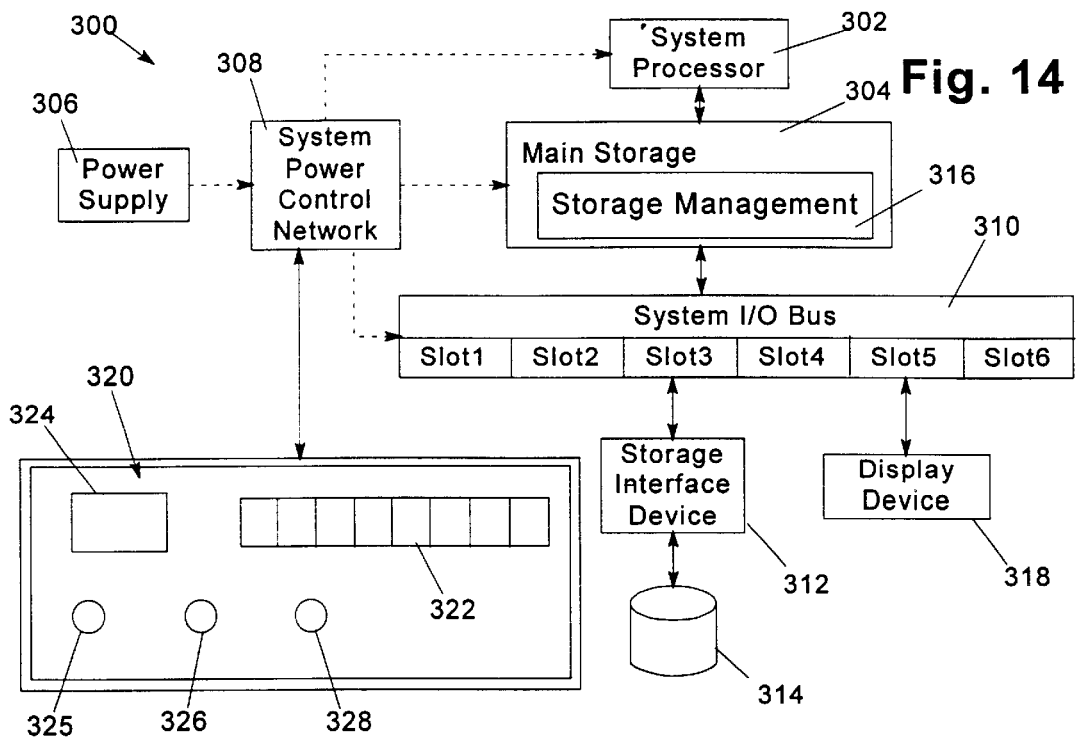
FIG. 14 is a block diagram of another computer system consistent with the invention, in which a control panel is utilized to support user input for initiating a concurrent maintenance operation in response to detection of a device failure.

In an alternate embodiment of the invention, it may be desirable to automate the detection of and recovery from a failure in a hardware device in conjunction with the use of a concurrent maintenance operation. For example, FIG. 14 illustrates an apparatus 300 that includes a processing complex including a system processor 302 coupled to a main storage 304. Apparatus 300 is powered by a power supply, illustrated at 306, that supplies power to various components in the apparatus through a system power control network (SPCN) 308. SPCN 308 is capable of selectively providing power to the various components in apparatus 300, including selectively supplying power to a system input/output (I/O) bus illustrated at 310.

System I/O bus 310 is coupled to the processing complex of processor 302 and main storage 304, and provides an interface with various hardware devices. One such device is a storage interface device 312 that functions as a controller for an external storage device 314. Device 312, for example, may be an input/output controller, or more specifically an input/output processor (IOP), that implements at least a portion of the interface between the processing complex and external storage device 314.

External storage device 314 may include practically any form of mass storage device, e.g., a direct access storage device (DASD), an optical drive, a floppy drive, a hard disk drive, and/or a tape drive, etc., irrespective of whether it is physically housed in the same housing as the processing complex.

Control over the higher-level transmission of data to and from external storage device 314 is principally handled in apparatus 300 by a storage management component 316, illustrated as being resident in main storage 304 and executed by system processor 302. It should be appreciated that component 316 may also be implemented in other hardware in apparatus 300 consistent with the invention.

A number of other hardware devices, e.g., a display device 318 and any of the other devices discussed above in connection with FIG. 1, may also be coupled to system I/O bus 310. Typically device 318 is used to interact with a user to handle various user operations with the apparatus.

As will become more apparent below, apparatus 300 supports the automated detection and notification of failed hardware devices to permit such a failure to be remedied by a user through a concurrent maintenance operation. For example, apparatus 300 may be configured to automatically detect a failure of storage interface device 312 in response to a failed access attempt on external storage device 14, and then to notify a user of such a failure. Moreover, as discussed in greater detail below, apparatus 300 may also be configured to automatically recover from the failed access attempt after a concurrent maintenance operation has been performed.

In the illustrated embodiment of FIG. 14, apparatus 300 is an AS/400 midrange computer available from International Business Machines Corporation. An AS/400 computer, like many other computers, relies in part on a virtual memory architecture; whereby information is selectively passed into and out of main storage 304 on an as-needed basis. Information is typically passed in and out of the main storage in groups commonly referred to as "pages", and as a result, passing information into and out of main storage is often referred to as "paging in" and "paging out", respectively.

Typically, whenever information such as program code is to be executed by the processor, that information is copied from an external storage device such as device 314 to main storage 304 so that it can be accessed by the processor. Similarly, if such information is no longer being used, and other information is needed, the unused information is often discarded or copied back into the external storage device to make room for the new information.

Information that is capable of being swapped into and out of main storage 304 is referred to herein as "swappable" information, as it is this information that is capable of being paged in or out of the main storage. Some information, however, that is critical to certain processes in a computer may need to be accessible at all times. Such information is referred to herein as "non-swappable" information, which can include information that is continuously maintained in main storage 304, e.g., in a non-swappable area thereof;

information that is stored in other memory devices in apparatus 300, e.g., in a read-only memory (ROM) for SPCN 308; and/or information such as program code that is executed by other processors in the apparatus, e.g., in a dedicated processor for SPCN 308.

While the use of a virtual memory architecture is an important and valuable feature of an apparatus, such an architecture can create an undesirable serviceability impediment in certain circumstances. Specifically, it may not be possible to perform any of the aforementioned concurrent maintenance operations on an apparatus that utilizes virtual memory if the failure of a hardware device in the apparatus prevents any of the program code necessary for implementing a concurrent maintenance operation to be paged into main storage and executed by the apparatus.

As an example, as discussed above, one suitable manner of initiating a concurrent maintenance operation is through a display user interface. However, in an apparatus such as the AS/400 computer, the program code that drives a display user interface is often swappable. Thus, in the instance where a hardware device that is responsible for swapping such program code in and out of main storage 304 fails, a risk exists that at least a portion of the program code necessary to operate the display user interface will not be available, and thus the display user interface will lock-up and prohibit a user from controlling the apparatus and initiating a concurrent maintenance operation to replace the failed hardware device.

Apparatus 300 of FIG. 14 addresses this specific problem through providing a facility for interfacing with the apparatus solely through non-swappable program code, such that the availability of all necessary program code for a concurrent maintenance operation is ensured. This facility may be provided alternatively to or in addition to a display user interface. Moreover, this facility typically may be significantly more primitive than the standard user interface to minimize the amount of program code that must be resident in the main storage, and to thereby minimize the amount of main storage needed in the apparatus. In the illustrated embodiment of FIG. 14, such a facility is provided through a control panel 320 coupled to SPCN 308.

In the AS/400 computer, for example, control panel 320 is provided directly in the housing, and includes an LED display 322 (e.g., with 8–12 characters) and several user controls, including a system power on/power off button 324, a "next function" button 325, a "previous function" button 326 and an "invoke function" button 328. Display 322 is used to display system reference codes (SRC's), control panel functions to be invoked, and the success or failure of functions that were invoked. Depression of buttons 325 and 326 scrolls display 322 through a numerically-ordered list of control panel functions, and depression of button 328 invokes the currently-displayed control panel function. Typically control panel 320 includes a dedicated processor and permanently-resident program code for managing one or more functions that may be selectively enabled or disabled, and for managing the display and user interface operations that can be performed through the panel.

An important aspect of control panel 320 is that the program code therefor is non-swappable, and thus always available. Other user interface facilities that are continuously available may be used in the alternative.

The discussion hereinafter will focus on the automated detection of and recovery from failure of a hardware device such as an input/output processor (IOP) that functions as a controller for an external storage device such as a DASD or the like. However, it should be appreciated that the invention may also have application in connection with maintaining other hardware devices, and thus, the invention should not be limited to use solely with this particular implementation.

Figure 15:
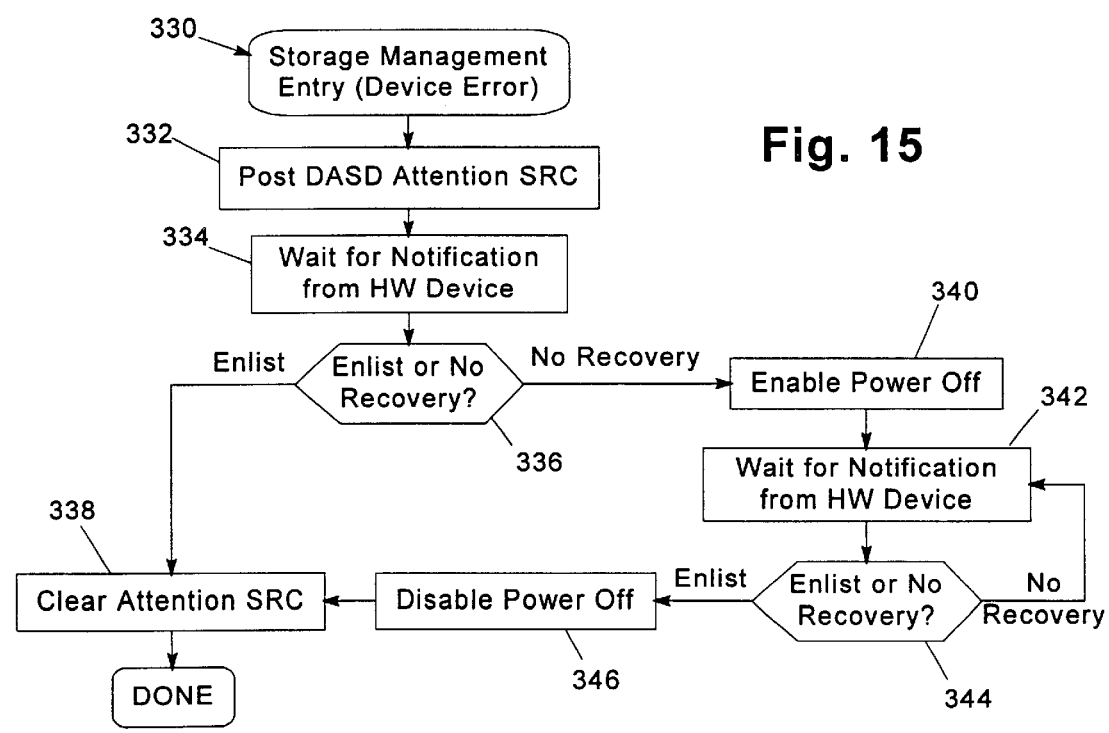
FIG. 15 is a flowchart illustrating the program flow of a storage management component in the computer system of FIG. 14, in response to receipt of a device error thereby.

Typically, automated detection of a failure in a hardware device associated with an external storage device is implemented in part in response to receipt of a device error by storage management component 316 in apparatus 300. Specifically, with respect to an IOP, such a device is conventionally provided with a manner of notifying storage management component 316 as to a failure in the IOP. As shown in FIG. 15, for example, in response to generation of a device error, an entry routine 330 may be executed by storage management component 316 (FIG. 14), with the device error passed as an input parameter for the routine.

Routine 330 begins in block 332 by posting a DASD attention system reference code (SRC) to control panel 320 (FIG. 14), in a manner known in the art. The SRC is used to display an error message on the control panel to alert the user (e.g., a systems administrator) of the failure. Typically, the SRC includes information such as unit address, type and model of the failed device, as well as the unit reference code associated with the original failure.

When the device error is passed to storage management component 316, the hardware driver for the IOP attempts to restart the failed IOP, e.g., through a reset and initial program load (IPL) operation. Next, block 334 waits for notification from the hardware driver for the DASD as to the result of the restart operation. If the operation is a success, an "enlist" notification is returned, whereby the hardware driver for the DASD requests to enlist the driver with the storage management facilities. If, however, the operation is not successful in recovering from the failure, a "no recovery" notification is returned.

Thus, in block 336, receipt of an "enlist" notification results in control passing to block 338 to clear the DASD attention SRC, whereby handling of the device error from the standpoint of the storage management component is complete (enlisting the recovered DASD device is handled by the DASD hardware driver). However, if a "no recovery" notification is received, control instead passes to block 340 to enable a power off operation on the control panel. This then permits a user, who has been notified of the failure by posting of the SRC, to initiate a concurrent maintenance operation via the control panel to replace the failed IOP. Replacement occurs in generally the same manner as discussed above for other replace operations, except that user input received to power up and/or power down the bus is handled with the control panel.

Once the power off function is enabled, control passes to block 342 to wait for a notification from the hardware driver for the DASD device. Thus, routine 330 basically waits for the IOP to be replaced, and then the bus to be powered back up, in a manner discussed in greater detail below. Either of the same two notifications discussed above may then be received. If a "no recovery" notification is received, control passes back to block 342 to continue to wait for the failed device to be replaced by a suitable device. On the other hand, if an "enlist" notification is received, it is known that the failed IOP has been successfully replaced, whereby control may pass to block 346 to disable the power off function on the control panel, and then to block 338 to clear the SRC. Processing by the storage management component is then complete.

Figure 16:
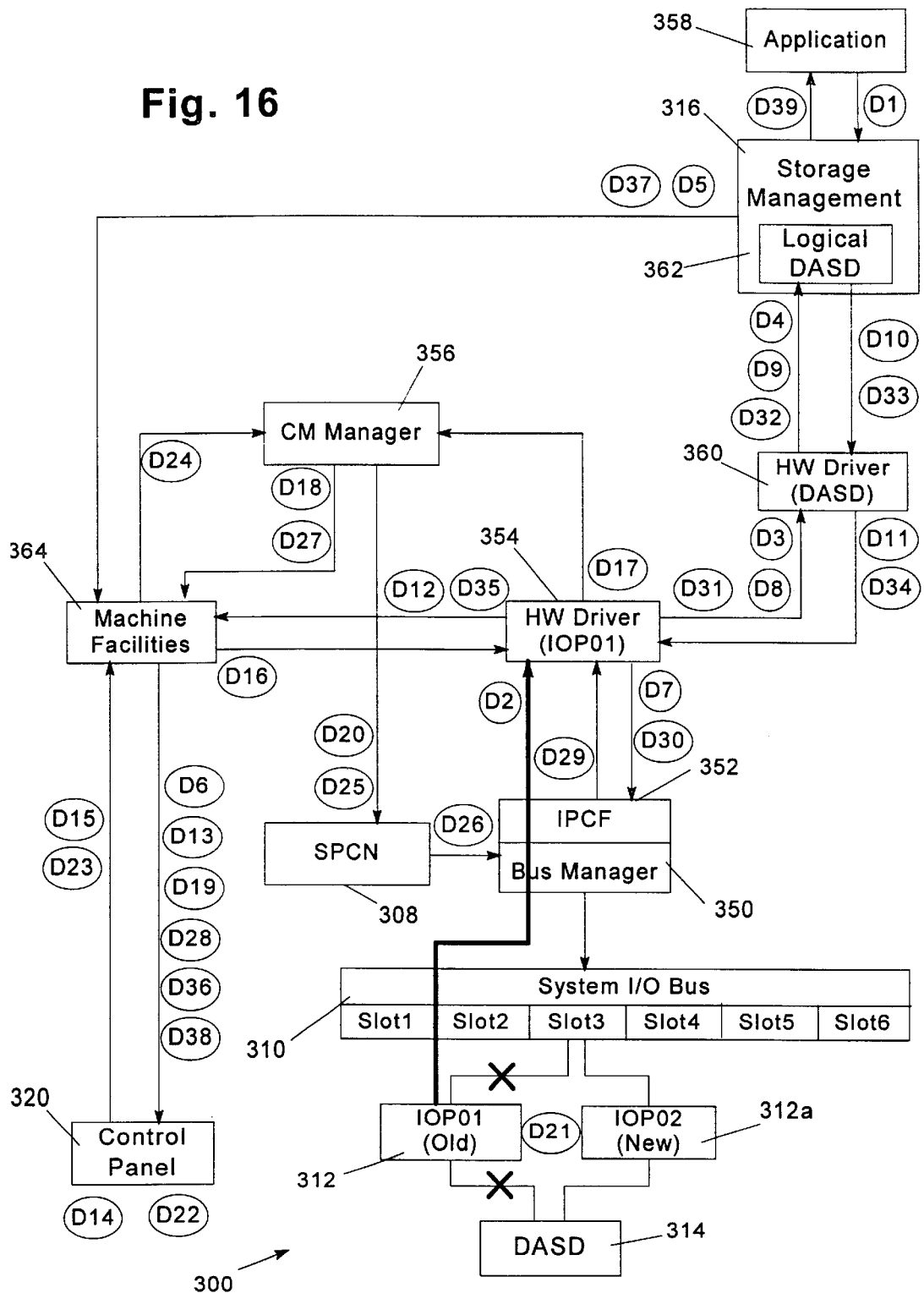
FIG. 16 is a block diagram illustrating the data flow between several software components in the computer system of FIG. 14 during detection of a failure in, and replacement of, a failed hardware device.

To better illustrate the operation of this implementation of the invention, FIG. 16 illustrates the data flow, and FIGS.

17A and 17B illustrate the program flow, that would occur in response to replacement of a failed IOP 312 (designated as IOP01) with a replacement IOP 312a (designated as IOP02) of the same type into the same slot (Slot3) in system bus 310 of apparatus 300, using the automated detection and recovery mechanism described herein. Each IOP is for use in controlling and interfacing with a DASD external storage device 314.

As with the embodiments described above with reference to FIGS. 1-13, apparatus 300 includes several components, including SPCN 308, bus 310, a bus manager 350, an interprocess communications function (IPCF) 352, a hardware driver 354 (for IOP01 312), a concurrent maintenance manager 356 and at least one application 358. Also included, but not shown in FIG. 16, is a HRI object for IOP01 312, and an HRI manager, each of which operate in the same manner as discussed above to define a resource associated with IOP01 312. Furthermore, as discussed above, apparatus 300 includes a storage management component 316 for use in controlling the storage facilities for the apparatus, and a control panel 320 for use in interfacing with a user during a concurrent maintenance operation.

Apparatus 300 also includes several additional components. First, a hardware driver 360 for DASD 314 is included to provide the necessary interface for controlling the DASD. An HRI object for the DASD may also be used, but is not shown in FIG. 16. In addition, a logical DASD object 362 is disposed within storage management component 316 to define the logical connection to DASD 314. Furthermore, a machine facilities component 364 is provided to provide a software interface between various hardware machine facilities, including (among others) SPCN 308 and control panel 320.

In the illustrated embodiment, it is desirable for at least the portions of the program code in each of components 308, 316, 320, 350, 352, 354, 356, 360, 362 and 364, that are necessary for implementing the concurrent maintenance operation described hereinafter, to be maintained as non-swappable program code—i.e., they are always resident and available whenever apparatus 300 is in a powered on and active state. As mentioned above, this may be due to such code being stored in dedicated memory in a specific component, and/or such code being stored in a protected area of the main storage that is not subject to being swapped out of main storage. Regardless, by making all of such program code resident and available, any failure to IOP01 312 that prevents paging from occurring will not result in any program code that is critical for performing the concurrent maintenance operation not being available when the operation is required to be performed.

Figure 17A:
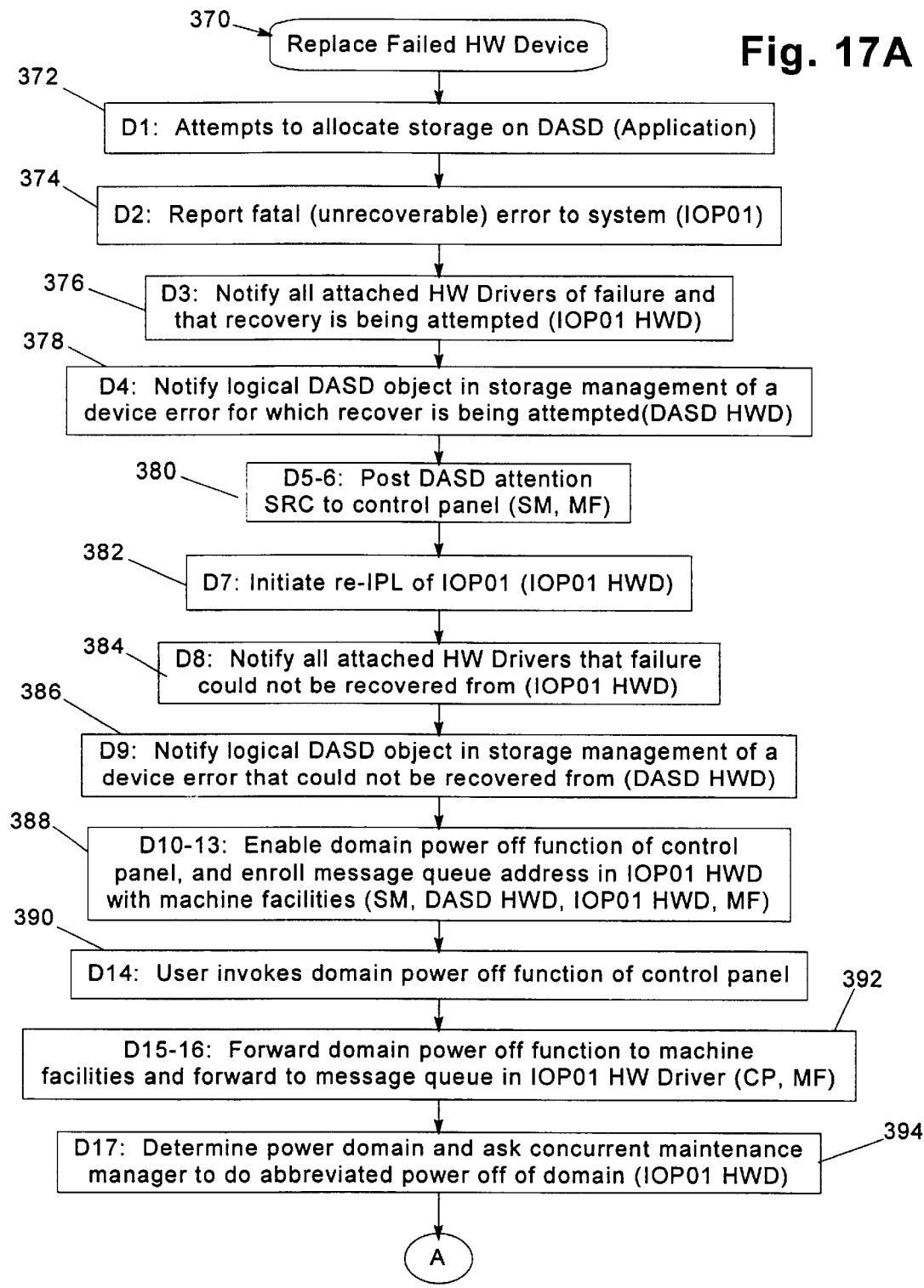

FIGS. 17A and 17B together illustrate the sequence of events occurring during an automated detection and recovery operation consistent with the invention. To correlate the flow of data and the invocation of methods in the various software components with the various sequence of events that occur during these operations, a sequence of reference numbers D1–D39 are provided in each of FIGS. 16, 17A and 17B, as with FIGS. 7-13 above.

The operations that occur during an automated detection and recovery operation are illustrated at 370 in FIG. 17A. First, in block 372, application 358 attempts to allocate storage on DASD 314 (D1). Next, in block 374, IOP01 312 fails, and as a result, reports a fatal (unrecoverable) error to the system (D2). Next, in block 376, IOP01 hardware driver 354 notifies all attached hardware drivers thereto (e.g., DASD hardware driver 360), that there has been a failure and recovery is being attempted (D3).

Next, in block 378, DASD hardware driver 360 notifies storage management component 316, and in particular, its associated logical DASD object 362, of a device error (D4) for which recovery is being attempted. The device error may or may not specify that the associated IOP failed—since all the logical DASD object needs to know is that a failure has occurred that prevents normal operation of the DASD device.

Next, in block 380, a DASD attention SRC is posted to machine facilities 364 (D5), which subsequently passes the SRC to control panel 320 (D6). This operation corresponds generally to block 332 of FIG. 15. As a result, an appropriate message is displayed on the control panel to alert a user of the device error.

Next, in block 382, IOP01 hardware driver 354 initiates a re-IPL of IOP01 312 (D7) to attempt to recover from the device error. Assuming that the recovery attempt also failed, IOP01 hardware driver 354 notifies all attached hardware drivers that the recovery attempt failed in block 384 (D8). In turn, in block 386, DASD hardware driver 360 notifies its logical DASD object 362 of the continued unrecoverable device error (D9).

In response to receipt of the device error, storage management component 316 enables a domain power off function on the control panel in block 388 by passing a message to DASD hardware driver 360 (D10), corresponding to block 340 of FIG. 15. DASD hardware driver 360 then forwards a message to IOP01 hardware driver 354 (D11), which in turn forwards a message to machine facilities 364 (D12). In this latter message, IOP01 hardware driver 354 passes a message queue address to machine facilities so that the hardware driver receives a notification when the power off function is invoked. Also, once machine facilities 364 receives the message from IOP01 hardware driver 354, the machine facilities enables the power off function in control panel 320 (D13).

Next, as illustrated by block 390, the user invokes the power off domain function of the control panel to initiate the concurrent maintenance operation (D14). Invocation of this function results in notification of the invocation to machine facilities 364 in block 392 (D15), which, by virtue of the enrollment of the message queue address by IOP01 hardware driver 354, results in a message being forwarded to the IOP01 hardware driver (D16). Then, in block 394, the IOP01 hardware driver determines the power domain for the failed IOP and requests concurrent maintenance manager 356 to perform an abbreviated power off of the domain (D17). The abbreviated power off basically follows the sequence of operations described above in connection with blocks 210–214 of FIG. 8. Blocks 206 and 208, which relate to notifying each hardware driver in the domain that power is being turned off, is omitted in the abbreviated power off to in essence bypass any steps that require operations by objects that may cause a page fault (since paging may be broken at this point). The notification is not necessary in this instance so long as replace operations are the only concurrent maintenance operations that are supported in response to the abbreviated power off.

Now turning to FIG. 17B, once the bus has been powered off, in block 396, concurrent maintenance manager 356 enables a domain power on function on the control panel via machine facilities 364, with a message queue address for the concurrent maintenance manager passed to the machine facilities so that notification of invocation of the power on function will be forwarded to the concurrent maintenance manager (D18–19). Once the power on function has been enabled, concurrent maintenance manager 356 requests initiation of the power off from SPCN 308 in block 398 (D20), which proceeds in the manner described above.

Next, once the bus has been powered off, the user is permitted to replace the failed IOP, IOP01 312, with a replacement IOP, IOP02 312*a*, as illustrated by block 400 (D21). Once the user has performed the replacement operation, the user then invokes the domain power on function via the control panel in block 402 (D22). The invocation of the function is then indicated to machine facilities 364 (D23) in block 404, which then sends a message to concurrent maintenance manager 356 (D24) by virtue of the previous enrollment of the concurrent maintenance manager in block 396 above. In response, in block 406 the concurrent maintenance manager asks SPCN 308 to power on the specified domain (D25). Then, in block 408, bus manager 350 is asked to walk the bus in the domain being powered on (D26) to initiate the restart operation. Also, in block 410, concurrent maintenance manager 356 disables the domain power on function on the control panel via machine facilities 364 (D27–28).

Next, as a result of the bus manager walking the bus, in block 412 IPCF 352 sends a bus recovered notification to the hardware driver associated with the slot in which replacement IOP02 312*a* has been installed—in this case, IOP01 hardware driver 354 (D29). This results in performance of basically the sequence of operations described above with respect to FIG. 9 to process the replacement operation (e.g., from block 234–244 of FIG. 9). Consequently, at this time, early life processing is performed, and the device identifier for the resource originally associated with IOP01 312 is updated to that of IOP02 312*a*, thereby associating the resource with IOP02 312*a* (D30).

Moreover, during early life processing, IOP02 312*a* reports all attached hardware devices thereto, in this case DASD 314. As a result, after the replacement operation has been completed, in block 416 IOP01 hardware driver 354 notifies DASD hardware driver 360 that its associated device is now back online (D31). Then, in block 418 DASD hardware driver 360 re-enlists with the storage management component 316 (D32). This notification is received by the storage management component (corresponding to block 342 of FIG. 15), and as a result, in block 420 the power off function in the control panel is disabled (corresponding to block 346 of FIG. 15) via DASD hardware driver 360, IOP01 hardware driver 354, and machine facilities 364 (D33–36). Next, in block 422 the DASD attention SRC is cleared from the control panel (corresponding to block 338 of FIG. 15) via machine facilities 364 (D37–38).

As another consequence of re-enlistment of the DASD hardware driver with the logical DASD object in storage management component 316, the failed attempt to allocate storage on the DASD is automatically retried in block 424 (D39), this time resulting in a successful operation. Pending operations to the DASD can then be processed as prior to failure of IOP01. Apparatus 300 has thus recovered from the lock-up condition and can continue to operate in a normal fashion.

It should therefore be appreciated that a failure of a hardware device that results in an inability to perform paging operations in a computer can still be recovered through the use of a user interface implemented in non-swappable program code in the computer. Moreover, applications that access resources affected by such a failure may not even have to be shut down or restarted in many instances. Rather, such applications often simply resume from the point at which they were suspended due to uncompleted access requests. Consequently, the replacement of a failed hardware device can be performed in a more simple and less intrusive manner, and with reduced computer downtime and reduced impact on system availability.

Various modifications may be made to the illustrated embodiments without departing from the spirit and scope of the invention. For example, rather than powering down a specific domain or bus, individual locations (e.g., slots) may be powered on and off to minimize the number of devices that are interrupted as a result of a concurrent maintenance operation. Moreover, other electrical interfaces between a hardware device and a computer may be used, e.g., direct point-to-point connections, other bus architectures, etc.

Various additional modifications to the embodiments described herein will become apparent to one of ordinary skill in the art. Therefore, the invention lies in the claims hereinafter appended.

What is claimed is:

1. A method of replacing a failed hardware device in a computer, the failed hardware device having associated therewith a resource that interfaces the failed hardware device with at least one application executing in the computer, the method comprising:

(a) removing power from the failed hardware device in response to user input received through a control panel on the computer;

(b) after user replacement of the failed hardware device with a replacement hardware device, supplying power to the replacement hardware device in response to user input received through the control panel; and (c) automatically associating the resource with the replacement hardware device after power is supplied to the replacement hardware device.

2. The method of claim 1, wherein removing power from the failed hardware device, supplying power to the replacement hardware device, and automatically associating the resource with the replacement hardware device are performed by non-swappable program code in the computer.

3. The method of claim 1, wherein the failed hardware device is coupled to the computer through a bus, wherein removing power from the failed hardware device includes removing power from the bus, and wherein supplying power to the replacement hardware device includes restoring power to the bus.

4. The method of claim 3, wherein the bus includes a plurality of locations, and wherein automatically associating the resource with the replacement hardware device associates the resource with the hardware device only if the replacement hardware device is installed in the same location on the bus as the failed hardware device.

5. The method of claim 1, wherein the failed and replacement hardware devices each have the same device type, wherein the resource includes a resource identifier that identifies the resource to at least one application executing on the computer, and a device type and a device identifier that initially identify the failed hardware device, and wherein automatically associating the resource with the replacement hardware device includes automatically updating the device identifier for the resource to that of the replacement hardware device while preserving the resource identifier for the resource.

6. The method of claim 1, further comprising:

(a) detecting a failure in the failed hardware device;

(b) in response to detection of the failure, enabling a first control panel operation configured to initiate the removal of power from the failed hardware device upon receipt of user input; and (c) in response to removal of power from the failed hardware device, enabling a second control panel operation configured to initiate the supply of power to the replacement hardware device upon receipt of user input.

7. The method of claim 6, wherein detecting the failure in the failed hardware device includes detecting a lock-up condition in the computer resulting from a failed attempt to access data with the failed hardware device, the method further comprising, after automatically associating the resource with the replacement hardware device, recovering from the lock-up condition by automatically resuming the failed attempt to access data with the failed hardware device.

8. An apparatus, comprising:

(a) a control panel configured to receive user input;

(b) a memory in which is resident a resource that is configured to provide an interface between a hardware device coupled to the apparatus and at least one application executing in the apparatus; and (c) a program, resident in the memory, the program configured to selectively remove power from a failed hardware device and supply power to a replacement hardware device in response to user input supplied to the control panel to permit replacement of the failed hardware device with the replacement hardware device; and, in response thereto, to automatically associate the resource with the replacement hardware device after power is supplied to the replacement hardware device.

9. The apparatus of claim 8, wherein the program and the resource are maintained in a non-swappable portion of the memory.

10. The apparatus of claim 8, further comprising a bus including a plurality of locations, and wherein the program is configured to associate the resource with the replacement hardware device only if the replacement hardware device is installed in the same location on the bus as was the failed hardware device.

11. The apparatus of claim 8, wherein the failed and replacement hardware devices each have the same device type, wherein the resource includes a resource identifier that identifies the resource to at least one application executing on the computer, and a device type and a device identifier that initially identify the failed hardware device, and wherein the program is configured to associate the resource with the replacement hardware device by automatically updating the device identifier for the resource to that of the replacement hardware device while preserving the resource identifier for the resource.

12. The apparatus of claim 8, wherein the program is further configured to detect a failure in the failed hardware device and to selectively enable an operation on the control panel to initiate removal of power from failed hardware device upon receipt of user input.

13. The apparatus of claim 12, wherein the program is further configured to detect the failure by detecting a lock-up condition in the apparatus resulting from a failed attempt to access data with the failed hardware device, and to recover from the lock-up condition after the failed hardware device has been replaced by the replacement hardware device by automatically resuming the failed attempt to access data with the failed hardware device.

14. A program product, comprising:

(a) a program for use in replacing a failed hardware device electrically coupled to a computer with a replacement hardware device, the failed hardware device having associated therewith a resource that interfaces the failed hardware device with at least one application executing in the computer, the program configured to selectively remove power from the failed hardware device and supply power to the replacement hardware device in response to user input supplied to a control panel in the computer to permit replacement of the failed hardware device with the replacement hardware device, the program further configured to automatically associate the resource with the replacement hardware device after power is supplied to the replacement hardware device; and (b) a signal bearing media bearing the program.

15. The program product of claim 14, wherein the signal bearing media is recordable media.

16. The program product of claim 14, wherein the signal bearing media is transmission type media.

17. A method of replacing a failed controller for an external storage device coupled to a computer over a bus, the failed controller having associated therewith a resource that presents a uniform interface to at least one application on the computer, the method comprising:

(a) detecting a lock-up condition in the computer resulting from a failed attempt to access data with the external storage device;

(b) in response to detection of the lock-up condition, enabling a user to replace the failed controller with a replacement controller;

(c) after replacement of the failed controller with a replacement controller, automatically updating the resource to associate the replacement controller with the resource; and (d) after updating the resource, recovering from the lock-up condition by automatically resuming the failed attempt to access data with the external storage device.

18. The method of claim 17, wherein enabling the user to replace the failed controller with the replacement controller includes:

(a) powering down the bus prior to removal of the failed controller from the bus; and (b) restoring power to the bus after installation of the replacement controller onto the bus.

19. The method of claim 18, further comprising maintaining the computer in a partially or fully active and powered-on state between powering down and restoring power to the bus.

20. The method of claim 18, wherein enabling the user to replace the failed controller with the replacement controller further includes:

(a) enabling a power off function on a control panel for the computer prior to powering down the bus; and (b) enabling a restore power function on the control panel for the computer prior to restoring power to the bus; wherein powering down the bus is performed in response to receipt of user input through the control panel to invoke the power off function, and wherein restoring power to the bus is performed in response to receipt of user input through the control panel to invoke the restore power function.

21. The method of claim 20, wherein enabling the user to replace the failed controller with the replacement controller further includes notifying the user of an error through the control panel.

22. The method of claim 17, wherein the resource includes a resource identifier that identifies the resource to at least one application executing on the computer and a device identifier that initially uniquely identifies the failed controller, and wherein automatically updating the resource includes automatically updating the device identifier to that of the replacement controller while preserving the resource identifier for the resource.

23. The method of claim 22, wherein the failed and replacement controllers each have associated therewith a hardware type, wherein the resource further includes a device type identifier that initially identifies the hardware type for the failed controller, and wherein automatically updating the resource is responsive to determining that the hardware type of the replacement controller matches that of the failed controller.

24. An apparatus, comprising:
 (a) a bus configured to electrically couple with a controller for an external storage device;
 (b) a memory in which is resident a resource that is configured to present a uniform interface to at least one application on the apparatus; and
 (c) a program, resident in the memory, the program configured to detect a lock-up condition in the apparatus resulting from a failed attempt to access data with an external storage device coupled to the bus through a failed controller, and in response thereto to enable a user to replace the failed controller with a replacement controller, the program further configured to automatically update the resource to associate the replacement controller with the resource, and to automatically rectify the lock-up condition by automatically resuming the failed attempt to access data with the external storage device.

25. The apparatus of claim 24, wherein the program is configured to enable the user to replace the failed controller with the replacement controller by selectively powering down and restoring power to the bus, while maintaining the apparatus in a partially or fully active and powered-on state between powering down and restoring power to the bus.

26. The apparatus of claim 25, further comprising a control panel configured to receive user input, wherein the program is further configured to enable the user to replace the failed controller with the replacement controller by enabling power off and restore power functions on the control panel.

27. The method of claim 24, wherein the resource includes a resource identifier that identifies the resource to at least one application executing on the computer system and a device identifier that initially uniquely identifies the failed controller, and wherein the program is further configured to automatically update the resource by automatically updating the device identifier to that of the replacement controller while preserving the resource identifier for the resource.

28. A program product, comprising:
 (a) a program for use in replacing a failed controller for an external storage device, the failed controller coupled to a bus in a computer and having associated therewith a resource configured to present a uniform interface to at least one application on the computer, the program configured to detect a lock-up condition in the computer resulting from a failed attempt to access data with the external storage device, and in response thereto to enable a user to replace the failed controller with a replacement controller, the program further configured to automatically update the resource to associate the replacement controller with the resource, and to automatically rectify the lock-up condition by automatically resuming the failed attempt to access data with the external storage device; and
 (b) a signal bearing media bearing the program.

29. The program product of claim 28, wherein the signal bearing media is recordable media.

30. The program product of claim 28, wherein the signal bearing media is transmission type media.

* * * * *